(12) United States Patent
Kamo et al.

(10) Patent No.: US 11,118,005 B2
(45) Date of Patent: Sep. 14, 2021

(54) COMPOSITION, HOLE TRANSPORT MATERIAL COMPOSITION, AND INK COMPOSITION

(71) Applicant: HITACHI CHEMICAL COMPANY, LTD., Tokyo (JP)

(72) Inventors: Kazuyuki Kamo, Tsukuba (JP); Hirotaka Sakuma, Hitachinaka (JP); Kenichi Ishitsuka, Nagareyama (JP); Tomotsugu Sugioka, Moriya (JP); Yuki Yoshinari, Tsukuba (JP); Ryo Honna, Hitachi (JP); Daisuke Ryuzaki, Tsuchiura (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

(21) Appl. No.: 16/338,840

(22) PCT Filed: Oct. 3, 2016

(86) PCT No.: PCT/JP2016/079304
§ 371 (c)(1),
(2) Date: Apr. 2, 2019

(87) PCT Pub. No.: WO2018/066034
PCT Pub. Date: Apr. 12, 2018

(65) Prior Publication Data
US 2020/0048408 A1 Feb. 13, 2020

(51) Int. Cl.
*C08G 61/12* (2006.01)
*C08L 65/00* (2006.01)
*C09D 11/38* (2014.01)

(52) U.S. Cl.
CPC ............ *C08G 61/124* (2013.01); *C08L 65/00* (2013.01); *C09D 11/38* (2013.01);
(Continued)

(58) Field of Classification Search
CPC ...... C08G 73/026; C09K 11/06; H01B 1/128; H05B 33/14; H01L 51/0043
See application file for complete search history.

(56) References Cited

U.S. PATENT DOCUMENTS

| 9,537,101 B2* | 1/2017 | Funyuu | ................ C08G 61/126 |
| 2014/0231791 A1* | 8/2014 | Funyuu | ............... H01L 51/0035 257/40 |
| 2016/0111647 A1* | 4/2016 | Funyuu | .................. C08L 65/00 257/40 |

FOREIGN PATENT DOCUMENTS

| CN | 103827165 B | 6/2016 |
| JP | 2004-199935 A | 7/2004 |

(Continued)

OTHER PUBLICATIONS

Alina Brzeczek et al., Synthesis and Characterization of 1,3,5-triphenylamine derivatives with star-shaped Architecture, Dyes and Pigments, May 20, 2016, p. 25-32 (cited in an office action in counterpart JP App. No. 2018-543490 dated Jun. 9, 2020).

(Continued)

*Primary Examiner* — Shane Fang
(74) *Attorney, Agent, or Firm* — Fitch, Even, Tabin & Flannery, LLP

(57) ABSTRACT

Embodiments of the present invention relate to a composition containing a polymer or oligomer (A) and an initiator (B), wherein the polymer or oligomer (A) contains no alkyl groups of 5 or more carbon atoms, contains at least one type of structural unit selected from the group consisting of a structural unit containing an aromatic amine structure and a structural unit containing a carbazole structure, and contains, at one or more terminals, a structural unit containing a thienyl group which may have a substituent, and a degree of (Continued)

solubility of the composition is capable of being changed by applying heat, light, or both heat and light.

15 Claims, 1 Drawing Sheet

(52) U.S. Cl.
CPC ... *C08G 2261/149* (2013.01); *C08G 2261/40* (2013.01); *C08G 2261/512* (2013.01); *C08G 2261/95* (2013.01)

(56) References Cited

FOREIGN PATENT DOCUMENTS

| TW | 201319114 A | 5/2013 |
|---|---|---|
| WO | 2005/053056 A1 | 6/2005 |
| WO | 2013/047581 A1 | 4/2013 |

OTHER PUBLICATIONS

Endo, A., Ogasawara, M., Takahashi, A., Yokoyama, D., Kato, Y. And Adachi, C. (2009), Thermally Activated Delayed Fluorescence from Sn4+—Porphyrin Complexes and Their Application to Organic Light Emitting Diodes—A Novel Mechanism for Electroluminescence. Adv. Mater., 21: 4802-4806. doi:10.1002/adma.200900983 (Cited in Specification).

Endo, A., Sato, K., Yoshimura, K., Kai, T., Kawada, A., et al. (2011) Efficient up-conversion of triplet excitons into a singlet state and its application for organic light emitting diodes. Appl. Phys. Lett. 98, 083302 ; doi: 10.1063/1.3558906 (Cited in Specification).

Nakagawa, T., Ku, S., Wong, K., Adachi, C. Electroluminescence based on thermally activated delayed fluorescence generated by a spirobifluorene donor—acceptor structure. Chem. Commun., 2012,48, 9580-9582 (Cited in Specification).

Lee, S., Yasuda, T., Nomura, H., and Adachi, C. High-efficiency organic light-emitting diodes utilizing thermally activated delayed fluorescence from triazine-based donor—acceptor hybrid molecules Appl. Phys. Lett. 101, 093306 (2012); doi: 10.1063/1.4749285 (Cited in Specification).

Zhang, Q., Li, J., Shizu, K,. Huang, S., Hirata, S., Miyazaki, H., and Adachi, C. Design of Efficient Thermally Activated Delayed Fluorescence Materials for Pure Blue Organic Light Emitting Diodes. J. Am. Chem. Soc., 134, 14706 (2012) (Cited in Specification).

Tanaka, H., Shizu, K., Miyazakiab, H., and Adachi, C. Efficient green thermally activated delayed fluorescence (TADF) from a phenoxazine—triphenyltriazine (PXZ-TRZ) derivative. Chem. Comm., 48, 11392 (2012) (Cited in Specification).

Uoyama, H., Goushi, K., Shizu, K., Nomura, H., and Adachi, C. Highly efficient organic light-emitting diodes from delayed fluorescence. Nature, 492, 234 (2012) (Cited in Specification).

Li, J., Nakagawa, T., MacDonald, J., Zhang, Q., Nomura, H., Miyazaki, H., and Adachi, C. Highly Efficient Organic Light-Emitting Diode Based on a Hidden Thermally Activated Delayed Fluorescence Channel in a Heptazine Derivative. Adv. Mater., 25, 3319 (2013) (Cited in Specification).

Ishimatsu, R., Matsunami, S., Shizu, K., Adachi, C., Nakano, K., and Imato, T. Solvent Effect on Thermally Activated Delayed Fluorescence by 1,2,3,5-Tetrakis(carbazol-9-yl)-4,6-dicyanobenzene J. Phys. Chem. A, 117, 5607 (2013) (Cited in Specification).

Serevicius, T., Nakagawa, T., Kuo, M., Cheng, S., Wong, K., Chang, C., Kwong, R. C., Xiae, S., and Adachi, C. Enhanced electroluminescence based on thermally activated delayed fluorescence from a carbazole—triazine derivative. Phys. Chem. Chem. Phys., 15, 15850 (2013) (Cited in Specification).

Nasu, K., Nakagawa, T., Nomura, H., Lin, C., Cheng, C., Tseng, M., Yasudaad, T., and Adachi, C. A highly luminescent spiro-anthracenone-based organic light-emitting diode exhibiting thermally activated delayed fluorescence Chem. Comm., 49, 10385 (2013) (Cited in Specification).

Li, B., Nomura, H., Miyazaki, H., Zhang, Q., Yoshida, K., Suzuma, Y., Orita, A., Otera, J., Adachi, C. Dicarbazolyldicyanobenzenes as Thermally Activated Delayed Fluorescence Emitters: Effect of Substitution Position on Photoluminescent and Electroluminescent Properties. Chem. Lett., 43, 319 (2014) (Cited in Specification).

Carlos A. Zuniga et al, "Approaches to Solution-Processed Multilayer Organic Light-Emitting Diodes Based on Cross-Linking" Chem. Mater., 2011, 23 (3), pp. 658-681 (Cited in Specification).

* cited by examiner

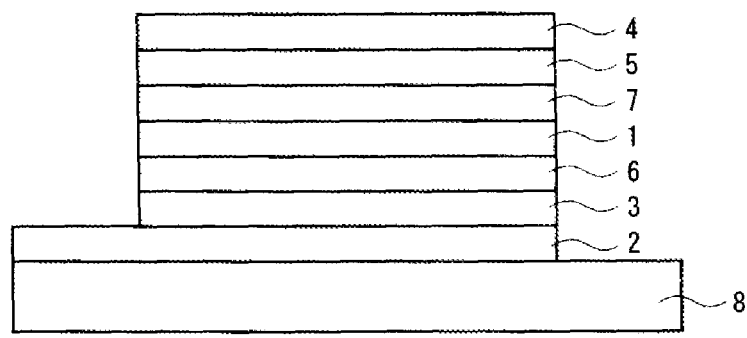

ID: 11,118,005 B2

COMPOSITION, HOLE TRANSPORT MATERIAL COMPOSITION, AND INK COMPOSITION

CROSS-REFERENCE TO RELATED APPLICATIONS

This application is a U.S. national phase application filed under 35 U.S.C. § 371 of International Application No. PCT/JP2016/079304, filed Oct. 3, 2016, designating the United States, which is hereby incorporated herein by reference in its entirety.

TECHNICAL FIELD

Embodiments of the present invention relate to a composition, a hole transport material composition, and an ink composition. Further, other embodiments of the present invention relate to an organic layer that uses the composition, the hole transport material composition or the ink composition, and a method for producing the organic layer. Furthermore, other embodiments of the present invention relate to an organic electronic element and an organic electroluminescent element (hereafter also referred to as an organic EL element) that have the organic layer. Moreover, other embodiments of the present invention relate to a display element, an illumination device and a display device that use the organic EL element.

BACKGROUND ART

Organic electronic elements are elements which use an organic substance to perform an electrical operation. Organic electronic elements are expected to be capable of providing advantages such as low energy consumption, low prices and superior flexibility, and are attracting considerable attention as a potential alternative technology to conventional inorganic semiconductors containing mainly silicon.

Among organic electronic elements, organic EL elements are attracting attention for potential use in large-surface area solid state lighting applications to replace incandescent lamps and gas-filled lamps and the like. Further, organic EL elements are also attracting attention as the leading self-luminous display for replacing liquid crystal displays (LCD) in the field of flat panel displays (FPD), and commercial products are becoming increasingly available.

Depending on the organic materials used, organic EL elements are broadly classified into two types: low-molecular weight type organic EL elements and polymer type organic EL elements. In low-molecular weight type organic EL elements, a low-molecular weight material is used as the organic material, whereas in polymer type organic EL elements, a polymer material is used. Compared with low-molecular weight type organic EL elements in which film formation is mainly performed in vacuum systems, polymer type organic EL elements enable simple film formation to be conducted by plate-based printing or inkjet application. As a result, polymer type organic EL elements are expected to be indispensable elements in future large-screen organic EL displays.

In recent years, in both low-molecular weight type organic EL elements and polymer type organic EL elements, multilayering of the organic layers that form the organic EL elements has been used to improve element characteristics such as the emission efficiency and the element lifespan.

In low-molecular weight type organic EL elements, because film formation is generally performed by a vapor deposition method, multilayering can be achieved easily by sequentially changing the compound being used in the vapor deposition. In contrast, in the case of polymer type organic EL elements, multilayering has proven problematic. The reason for this problem is that in polymer type organic EL elements, because film formation is performed by wet processes such as plate-based printing or inkjet application, the initially formed lower layer tends to dissolve in the solvent used when forming the upper layer. In order to enable multilayering of polymer type organic EL elements, a method is required that enables the previously formed lower layer to remain unchanged during formation of the upper layer.

Investigations have been conducted into the use of reactions of compounds as a method for enabling the multilayering of polymer type organic EL elements (for example, see Patent Literature 1, Patent Literature 2 and Non-Patent Literature 1). These literatures disclose methods for achieving multilayering by reacting a polymerizable substituent that has been introduced into a compound. Examples include multilayering that utilizes the polymerization reaction of a silyl group, styryl group, oxetanyl group, or acrylic group or the like, and multilayering that utilizes the dimerization of a trifluorovinyl ether group or a benzocyclobutene group or the like.

CITATION LIST

Patent Literature

PLT 1: JP 2004-199935 A
PLT 2: WO 2005/053056

Non Patent Literature

NPL 1: Carlos A. Zuniga, Stephen Barlow, and Seth R. Marder, "Approaches to Solution-Processed Multilayer Organic Light-Emitting Diodes Based on Cross-Linking", Chem. Mater., 2011, 23 (3), pp 658-681

SUMMARY OF INVENTION

Technical Problem

Embodiments of the present invention have the objects of providing a composition, a hole transport material composition and an ink composition that enable the multilayering of organic layers using coating methods, and are useful in improving the characteristics of organic electronic elements. Further, other embodiments of the present invention have the objects of providing an organic layer that enables multilayering by coating methods and is useful in improving the characteristics of organic electronic elements, as well as a method for producing such an organic layer. Further, other embodiments of the present invention have the objects of providing an organic electronic element and an organic EL element that have excellent characteristics. Moreover, other embodiments of the present invention have the objects of providing a display element, an illumination device and a display device that have excellent characteristics.

Solution to Problem

One embodiment of the present invention relates to a composition containing a polymer or oligomer (A) and an initiator (B), wherein the polymer or oligomer (A) contains no alkyl groups of 5 or more carbon atoms, contains at least one type of structural unit selected from the group consisting of a structural unit containing an aromatic amine structure and a structural unit containing a carbazole structure, and contains, at one or more terminals, a structural unit containing a thienyl group which may have a substituent, and the degree of solubility of the composition is capable of being changed by applying heat, light, or both heat and light.

In the above composition, the thienyl group preferably includes at least one type of structure selected from the group consisting of a structure represented by formula (Ia) shown below and a structure represented by formula (Ib) shown below.

[Chemical formula 1]

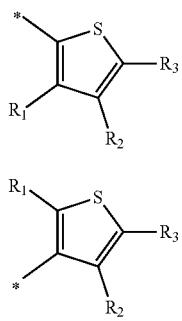

Formula (Ia)

Formula (Ib)

(Each of $R^1$ to $R^3$ in formula (Ia) and formula (Ib) independently represents a hydrogen atom or an alkyl group of 1 to 4 carbon atoms, provided that at least two of $R^1$ to $R^3$ are hydrogen atoms.)

The aromatic amine structure and the carbazole structure mentioned above may, for example, be unsubstituted, or may have an alkyl group of 1 to 4 carbon atoms or an alkoxy group of 1 to 4 carbon atoms.

The polymer or oligomer (A) preferably has a branched structure with three or more terminals, and has the thienyl group at each of three or more of all of the terminals.

In any of the compositions described above, the initiator (B) preferably contains an oxidizing agent.

In any of the compositions described above, the initiator (B) preferably contains an onium salt.

The weight average molecular weight of the polymer or oligomer (A) described above is, for example, from 1,000 to 1,000,000.

Any of the compositions described above may also contain a solvent (C).

In any of the compositions described above, the surface free energy of the polymer or oligomer (A), represented by the sum of a polar component and a non-polar component determined by the Owens-Wendt method, is preferably at least 41 mJ/m2.

Another embodiment of the present invention relates to a hole transport material composition containing any of the compositions described above.

Further, another embodiment of the present invention relates to an ink composition containing any of the compositions described above.

Another embodiment of the present invention relates to an organic layer that is formed by applying any of the compositions described above, the hole transport material composition described above or the ink composition described above, and then applying heat, light, or both heat and light.

Further, yet another embodiment of the present invention relates to a method for producing an organic layer that includes a step of forming a coating layer by applying any of the compositions described above, the hole transport material composition described above or the ink composition described above, and a step of applying heat, light, or both heat and light to the coating layer.

Other embodiments of the present invention relate to an organic electronic element and an organic electroluminescent element that have at least one of the organic layer described above. In a preferred embodiment, the organic electroluminescent element also has a flexible substrate. In one preferred embodiment, the organic electroluminescent element also has a resin film substrate.

Moreover, other embodiments of the present invention relate to a display element and an illumination device containing any of the organic electroluminescent elements described above, and to a display device containing the illumination device and a liquid crystal element as a display unit.

Advantageous Effects of Invention

Embodiments of the present invention can provide a composition, a hole transport material composition and an ink composition that enable the multilayering of organic layers using coating methods, and are useful in improving the characteristics of organic electronic elements. Further, other embodiments of the present invention can provide an organic layer that enables multilayering by coating methods and is useful in improving the characteristics of organic electronic elements, as well as a method for producing such an organic layer. Further, other embodiments of the present invention can provide an organic electronic element and an organic EL element that have excellent characteristics. Moreover, other embodiments of the present invention can provide a display element, an illumination device and a display device that have excellent characteristics.

BRIEF DESCRIPTION OF DRAWINGS

The FIGURE is a cross-sectional schematic view illustrating one example of an organic EL element according to an embodiment of the present invention.

DESCRIPTION OF EMBODIMENTS

Embodiments of the present invention are described below.

<Composition>

A composition that represents one embodiment of the present invention contains a polymer or oligomer (A) and an initiator (B). The degree of solubility of the composition is capable of being changed by applying heat, light, or both heat and light.

[Polymer or Oligomer (A)]

The polymer or oligomer (A) (hereafter sometimes referred to as the "polymer (A)") contains at least one type of structural unit selected from the group consisting of structural units containing an aromatic amine structure and structural units containing a carbazole structure, and contains a structural unit containing a thienyl group which may have a substituent at one or more terminals of the polymer (A). The polymer (A) contains no alkyl groups of 5 or more carbon atoms within the molecule. An "alkyl group of 5 or more carbon atoms" describes an alkyl group which contains 5 or more carbon atoms, may be linear, cyclic or branched, and has no substituents.

The polymer (A) may be a linear polymer, or may be a branched polymer having a branched structure. A linear polymer (A) contains a divalent structural unit and a monovalent structural unit that forms the terminal portions. A branched polymer (A) contains a trivalent or higher structural unit that forms a branched portion and a monovalent structural unit that forms the terminal portions, and may also contain a divalent structural unit. The polymer (A) may contain only one type of each of these structural units, or may contain a plurality of types of each structural unit. In the polymer (A), the various structural units are bonded together at "monovalent" to "trivalent or higher" bonding sites. In the following description, a monovalent structural unit is sometimes called a "structural unit T", a divalent structural unit is sometimes called a "structural unit L", and a trivalent or higher structural unit is sometimes called a "structural unit B".

(Structural Unit Containing an Aromatic Amine Structure)

The structural unit containing an aromatic amine structure is a monovalent or higher structural unit, and from the viewpoint of achieving superior charge transport properties, is preferably a divalent or higher structural unit. Further, for the same reason, the structural unit is preferably hexavalent or lower, and is more preferably tetravalent or lower. From the viewpoint of improving the characteristics of organic electronic elements, the structural unit containing an aromatic amine structure contains no alkyl groups of 5 or more carbon atoms.

For the aromatic amine structure, a tertiary aromatic amine structure is preferred, and a triarylamine structure (tertiary aromatic hydrocarbon structure) is more preferred. The number of carbon atoms in the aryl group is preferably from 6 to 14, more preferably from 6 to 10, and is even more preferably 6. From the viewpoint of obtaining superior charge transport properties, a triphenylamine structure is particularly preferred.

The aromatic amine structure may be unsubstituted, or a substituent may be bonded to the aromatic amine structure. From the viewpoint of improving the solubility of the polymer (A), suitable examples of the substituent include alkyl groups of 1 to 4 carbon atoms, and alkoxy groups of 1 to 4 carbon atoms and the like. From the viewpoint of improving the solubility of the polymer (A), the number of carbon atoms in the substituent is preferably from 2 to 4, more preferably 3 or 4, and is even more preferably 4.

Further, from the viewpoint of improving the element characteristics, no alkyl groups of 5 or more carbon atoms are bonded to the aromatic amine structure. The expression that "no alkyl groups of 5 or more carbon atoms are bonded to the aromatic amine structure" means that no alkyl groups of 5 or more carbon atoms exist that are bonded directly to the aromatic rings and N (nitrogen atom) that are contained in the aromatic amine structure, and that no alkyl groups of 5 or more carbon atoms exist that are bonded to the aromatic rings and N (nitrogen atom) that are contained in the aromatic amine structure via an arbitrary atom or atom grouping. Examples of the arbitrary atom or atom grouping include —O— (an ether linkage), and —C(=O)— (a carbonyl linkage) and the like.

Examples of the structural unit containing an aromatic amine structure include the structural units shown below.

<<Divalent Structural Units Containing an Aromatic Amine Structure>>

[Chemical formula 2]

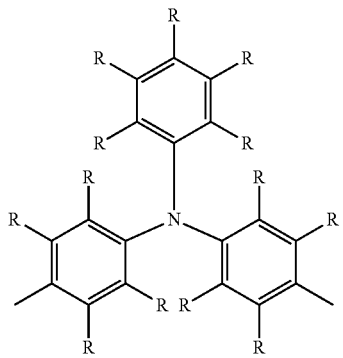

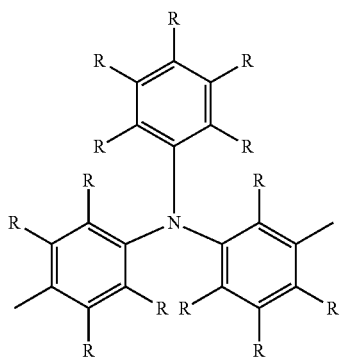

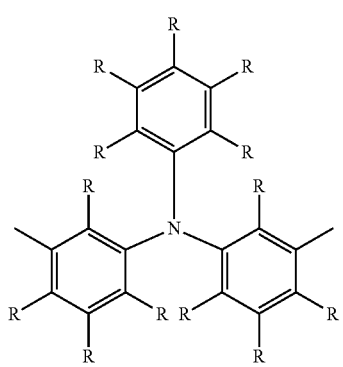

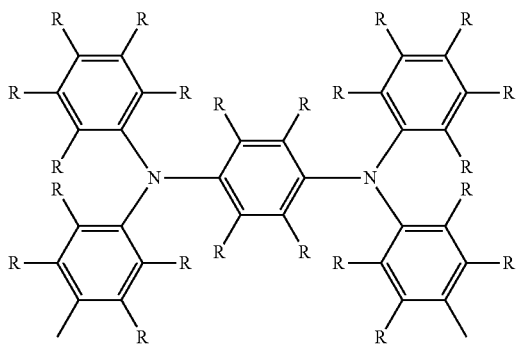

-continued

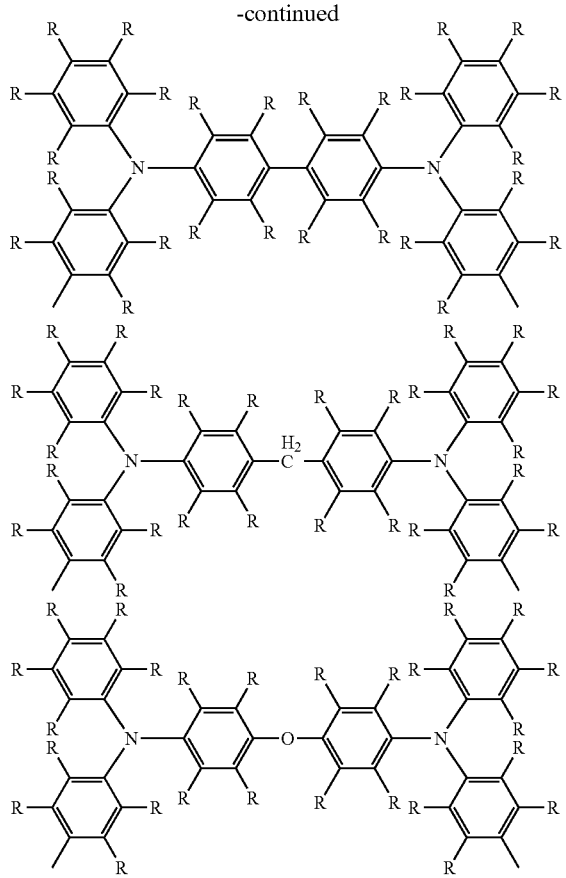

In the formulas, each R independently represents a hydrogen atom or a substituent. Examples of the substituent include alkyl groups of 1 to 4 carbon atoms and alkoxy groups of 1 to 4 carbon atoms. The number of carbon atoms is preferably from 2 to 4, more preferably 3 or 4, and is particularly preferably 4. In preferred examples, each of the structural units has at least one group selected from the group consisting of alkyl groups of 1 to 4 carbon atoms and alkoxy groups of 1 to 4 carbon atoms. In more preferred example, in each structural unit, one R group represents an alkyl group of 1 to 4 carbon atoms or an alkoxy group of 1 to 4 carbon atoms, and the remaining R groups are hydrogen atoms.

<<Trivalent or Higher Structural Units Containing an Aromatic Amine Structure>>

[Chemical formula 3]

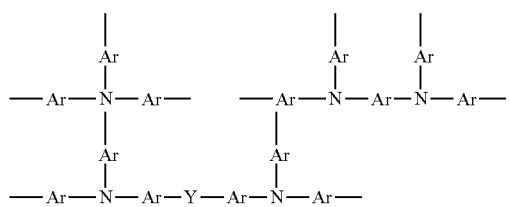

In the formulas, each Ar independently represents an arylene group or a heteroarylene group. An arylene group is preferred. The number of carbon atoms in the arylene group is preferably from 6 to 14, more preferably from 6 to 10, and is even more preferably 6. The arylene group is preferably a phenylene group. Ar may have a substituent, and examples of the substituent include the same groups described above for R in the divalent structural units containing an aromatic amine structure. In one example, in each of the above structural units, all of the Ar groups are unsubstituted. Y represents a divalent linking group, and examples include divalent groups in which an additional one hydrogen atom has been removed from an R group having one or more hydrogen atoms described below in relation to a structural unit 1. Y also contains no alkyl groups of 5 or more carbon atoms.

<<Monovalent Structural Units Containing an Aromatic Amine Structure>>

[Chemical formula 4]

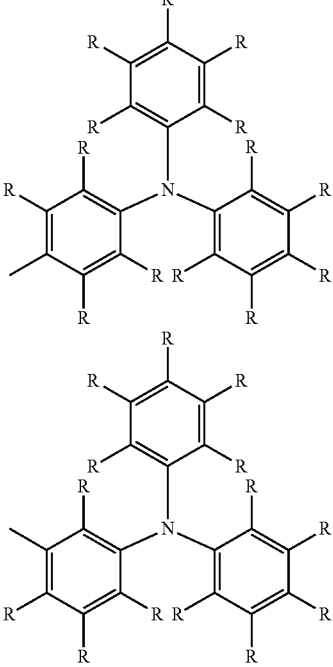

In the formulas, R is the same as R in the divalent structural units containing an aromatic amine structure described above. In one example, in each of the above structural units, all of the R groups are hydrogen atoms.

The structural unit containing an aromatic amine structure is not limited to the above structures, provided the structural unit contains an aromatic amine structure and contains no alkyl groups of 5 or more carbon atoms.

(Structural Unit Containing a Carbazole Structure)

The structural unit containing a carbazole structure is a monovalent or higher structural unit, and from the viewpoint of achieving superior charge transport properties, is preferably a divalent or higher structural unit. Further, for the same reason, the structural unit is preferably hexavalent or lower, and is more preferably tetravalent or lower. From the viewpoint of improving the characteristics of organic electronic elements, the structural unit containing a carbazole structure contains no alkyl groups of 5 or more carbon atoms.

The carbazole structure may be unsubstituted, or a substituent may be bonded to the carbazole structure. From the viewpoint of improving the solubility of the polymer (A), suitable examples of the substituent include alkyl groups of 1 to 4 carbon atoms, and alkoxy groups of 1 to 4 carbon atoms and the like. From the viewpoint of improving the solubility of the polymer (A), the number of carbon atoms in the substituent is preferably from 2 to 4, more preferably 3 or 4, and is even more preferably 4.

Further, from the viewpoint of improving the element characteristics, no alkyl groups of 5 or more carbon atoms are bonded to the carbazole structure. The expression that "no alkyl groups of 5 or more carbon atoms are bonded to the carbazole structure" means that no alkyl groups of 5 or more carbon atoms exist that are bonded directly to the benzene rings and N (nitrogen atom) that are contained in the carbazole structure, and that no alkyl groups of 5 or more carbon atoms exist that are bonded to the benzene rings and N (nitrogen atom) that are contained in the carbazole structure via an arbitrary atom or atom grouping. The arbitrary atom or atom grouping are as described above.

Examples of the structural unit containing a carbazole structure include the structural units shown below.

<<Divalent Structural Units Containing a Carbazole Structure>>

[Chemical formula 5]

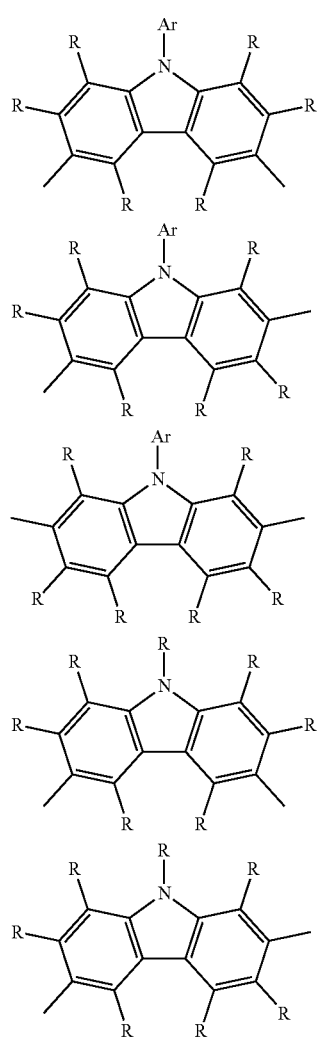

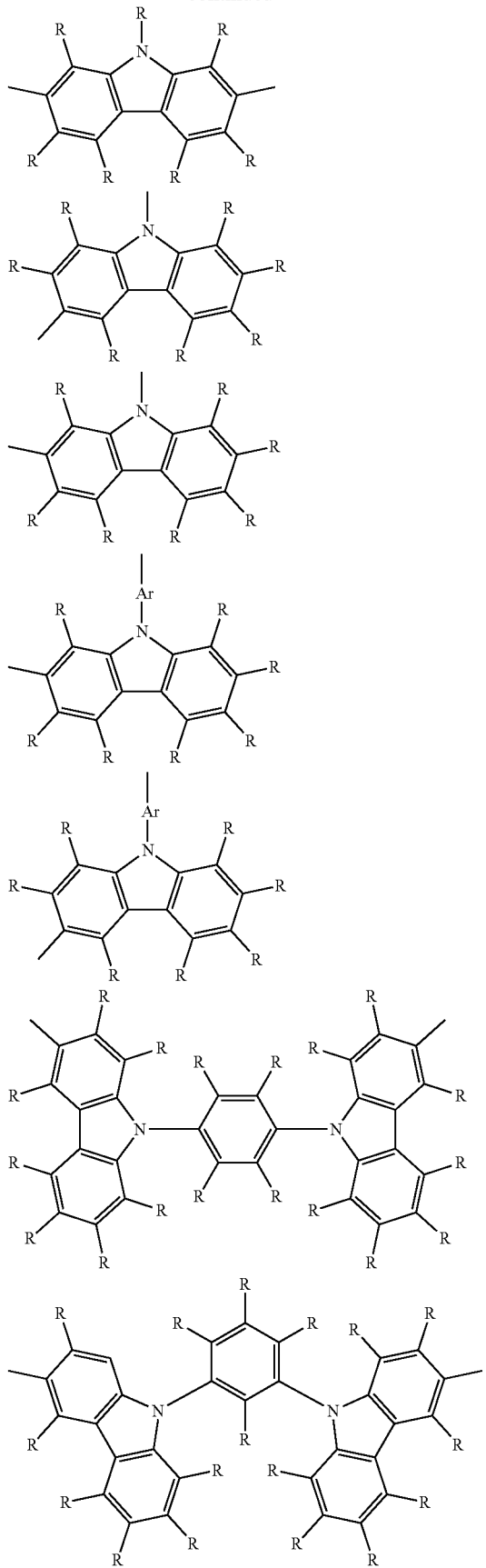

-continued

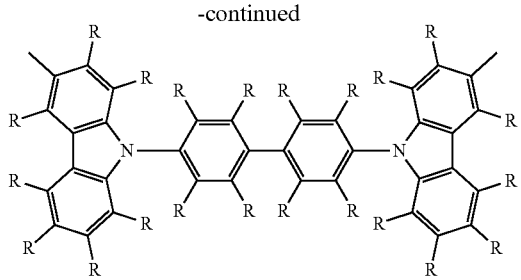

In the formulas, R is the same as R in the divalent structural units containing an aromatic amine structure described above. Each Ar independently represents an aryl group or heteroaryl group, or an arylene group or heteroarylene group. An aryl group or arylene group is preferred. The number of carbon atoms in the aryl group or arylene group is preferably from 6 to 14, more preferably from 6 to 10, and is even more preferably 6. The aryl group is preferably a phenyl group, and the arylene group is preferably a phenylene group. Ar may have a substituent, and examples of the substituent include the same groups described above for R. In preferred examples, each of the above structural units preferably has at least one group selected from the group consisting of alkyl groups of 1 to 4 carbon atoms and alkoxy groups of 1 to 4 carbon atoms. In more preferred examples, in each structural unit, one R group represents an alkyl group of 1 to 4 carbon atoms or an alkoxy group of 1 to 4 carbon atoms, the remaining R groups are hydrogen atoms, and any included Ar group is unsubstituted; or alternatively, Ar has one R group, that R group is an alkyl group of 1 to 4 carbon atoms or an alkoxy group of 1 to 4 carbon atoms, and the remaining R groups are hydrogen atoms.

<<Trivalent or Higher Structural Units Containing a Carbazole Structure>>

[Chemical formula 6]

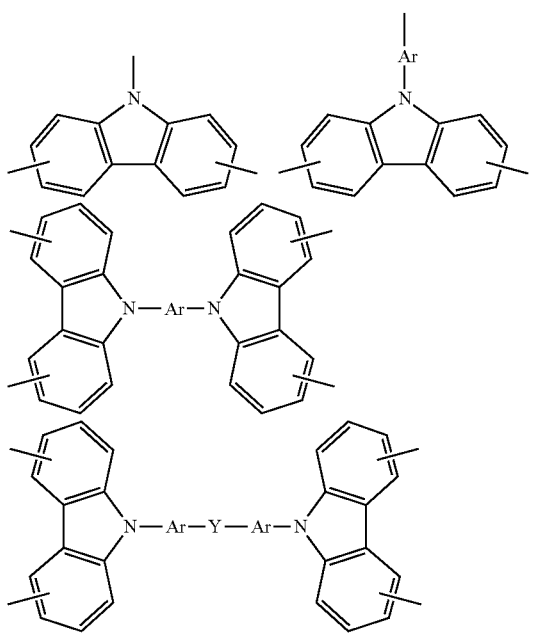

In the formulas, each Ar independently represents the same as Ar in the trivalent or higher structural unit containing an aromatic amine structure described above. The benzene rings and Ar groups may have substituents, and examples of the substituents include the same groups as those described above for R in the divalent structural unit containing an aromatic amine structure. In one example, in each of the above structural units, the benzene rings and any included Ar groups are all unsubstituted. Y is the same as Y in the trivalent or higher structural unit containing an aromatic amine structure described above.

<<Monovalent Structural Units Containing a Carbazole Structure>>

[Chemical formula 7]

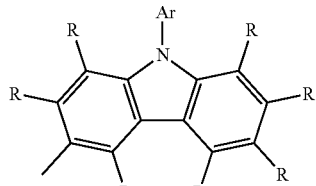

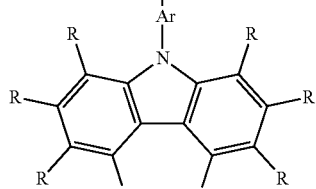

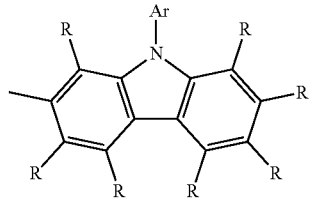

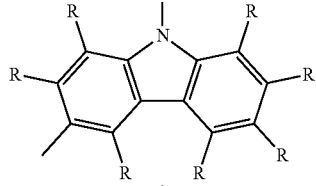

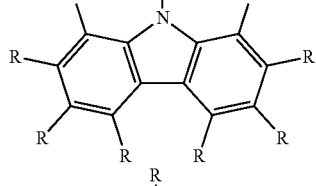

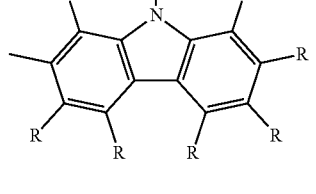

In the formulas, R and Ar are the same as R and Ar in the divalent structural units containing a carbazole structure described above. In one example, in each of the above structural units, all of the R groups are hydrogen atoms and any included Ar groups are unsubstituted.

The structural unit containing a carbazole structure is not limited to the above structures, provided the structural unit contains a carbazole structure and contains no alkyl groups of 5 or more carbon atoms.

(Structural Unit Containing a Thienyl Group)

The polymer (A) has at least a structural unit containing a thienyl group which may have a substituent as the monovalent structural units positioned at the terminals of the polymer chain. From the viewpoint of improving the characteristics of organic electronic elements, the structural unit containing a thienyl group contains no alkyl groups of 5 or more carbon atoms.

The thienyl group may be unsubstituted, or may have a substituent. From the viewpoint of the solubility and the change in the degree of solubility of the polymer (A), examples of preferred substituents include alkyl groups of 1 to 4 carbon atoms, and alkyl groups of 1 to 3 carbon atoms are more preferred, alkyl groups of 1 or 2 carbon atoms are even more preferred, and a methyl group is particularly desirable.

Further, from the viewpoint of improving the element characteristics, the substituent that may be included in the thienyl group contains no alkyl groups of 5 or more carbon atoms. In other words, no alkyl groups of 5 or more carbon atoms are bonded to the thienyl group, either directly or via an arbitrary atom or atom grouping. Examples of this arbitrary atom or atom grouping are as described above.

Examples of the thienyl group which may have a substituent include 2-thienyl groups and 3-thienyl groups which may have a substituent. The thienyl group is, for example, represented by formula (Ia) or formula (Ib) shown below.

<<Thienyl Groups>>

[Chemical formula 8]

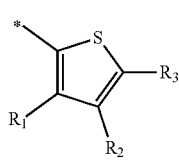

Formula (Ia)

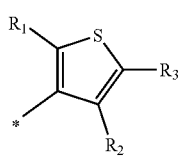

Formula (Ib)

(Each of $R^1$ to $R^3$ in Formula (Ia) and Formula (Ib) Independently Represents a Hydrogen Atom or an alkyl group of 1 to 4 carbon atoms, provided that at least two of $R^1$ to $R^3$ are hydrogen atoms.)

The number of carbon atoms in the alkyl group is preferably from 1 to 3, more preferably 1 or 2, and even more preferably 1.

Examples of the structural unit containing a thienyl group include structural units represented by formulas (IIa) to (IIb-2) shown below.

<<Structural Units Containing a Thienyl Group>>

[Chemical formula 9]

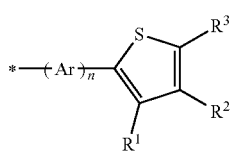

Formula (IIa)

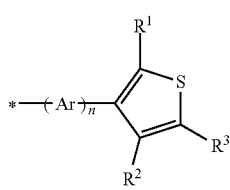

Formula (IIb)

(Each of $R^1$ to $R^3$ in formula (IIa) and formula (IIb) independently represents a hydrogen atom or an alkyl group of 1 to 4 carbon atoms, provided that at least two of $R^1$ to $R^3$ are hydrogen atoms, Ar represents an arylene group or a heteroarylene group, and n represents 0 or 1.)

[Chemical formula 10]

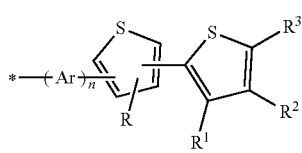

Formula (IIa-1)

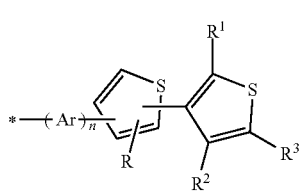

Formula (IIb-1)

(Each of $R^1$ to $R^3$ in formula (IIa-1) and formula (IIb-1) independently represents a hydrogen atom or an alkyl group of 1 to 4 carbon atoms, provided that at least two of $R^1$ to $R^3$ are hydrogen atoms, Ar represents an arylene group or a heteroarylene group, and n represents 0 or 1.)

[Chemical formula 11]

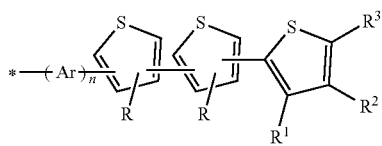

Formula (IIa-2)

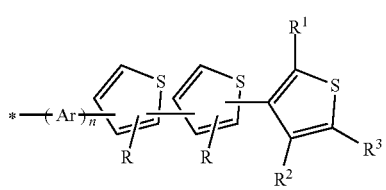

Formula (IIb-2)

(Each of $R^1$ to $R^3$ in formula (IIa-2) and formula (IIb-2) independently represents a hydrogen atom or an alkyl group of 1 to 4 carbon atoms, provided that at least two of $R^1$ to $R^3$ are hydrogen atoms, Ar represents an arylene group or a heteroarylene group, and n represents 0 or 1.)

Specific examples of the structural unit containing a thienyl group are shown below. In the formulas, n is an integer of 1 to 4.

<<Thienyl Group Series>>

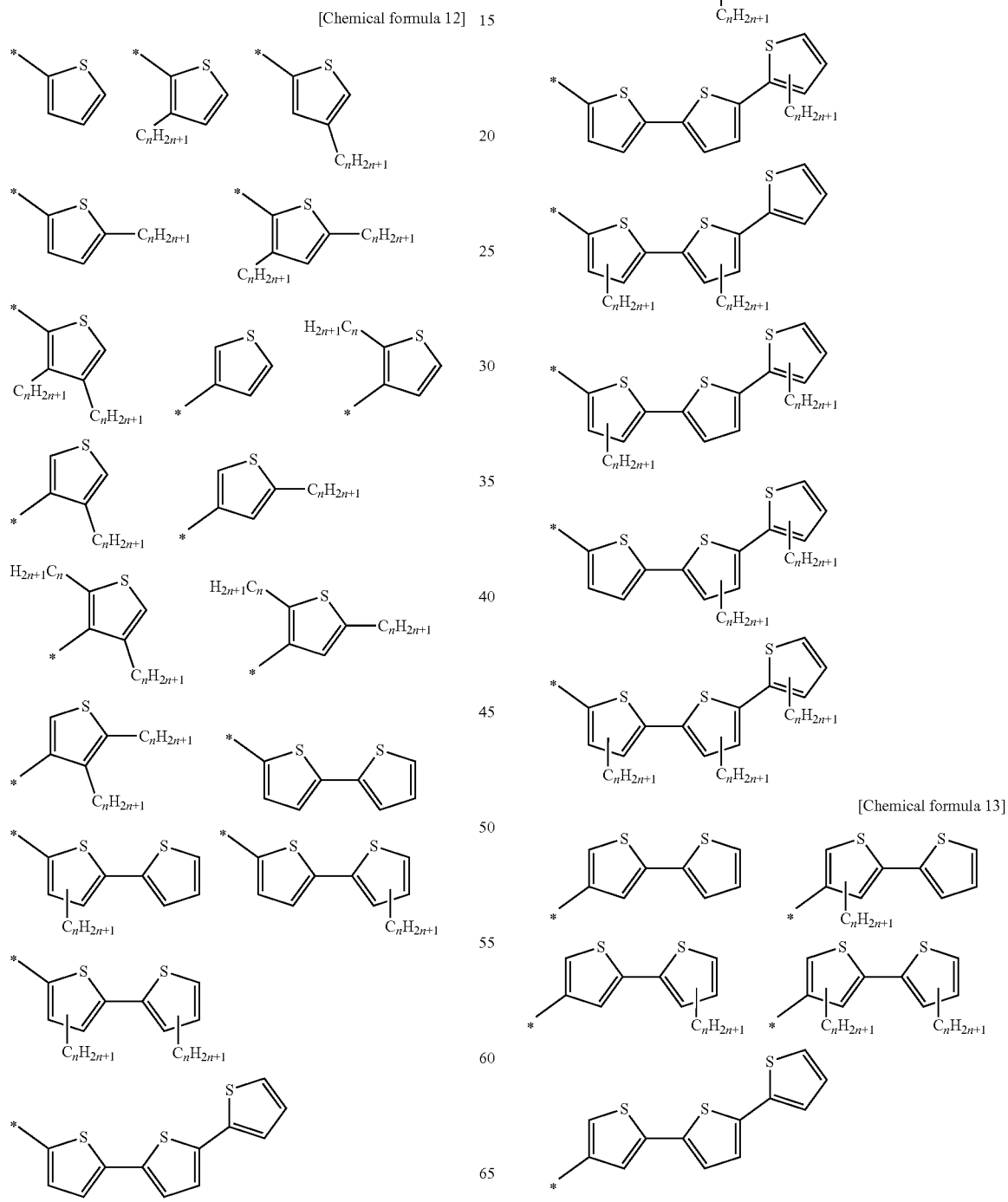

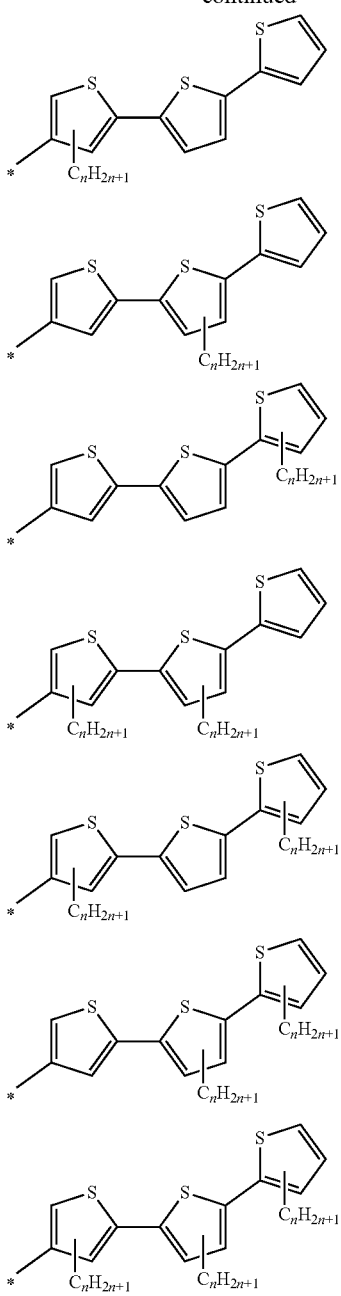

Among the above structural units, from viewpoints such as increasing the change in the degree of solubility, reducing the effect on the energy levels of the charge transport portions, and improving the productivity, the structures shown below are preferred. In these formulas, n is an integer of 1 to 4.

[Chemical formula 14]

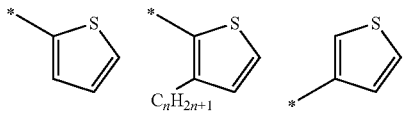

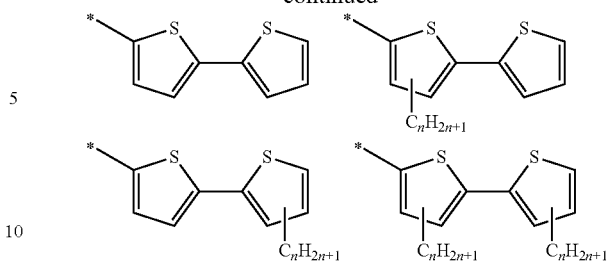

In the above examples of structural units containing a thienyl group, and in the examples shown in the thienyl group series, the number of carbon atoms in each alkyl group is preferably from 1 to 3, more preferably 1 or 2, and even more preferably 1.

The polymer (A) has the structural unit containing a thienyl group which may have a substituent at one or more terminals. In those cases where the polymer (A) has a branched structure, these terminals may be the terminals of the main chain or a terminal of a side chain, or may include terminals of both the main chain and side chains. Further, the polymer (A) may have the structural unit containing a thienyl group at all of the terminals, or at only a portion of all the terminals. Specific examples include cases where the polymer (A) has two terminals, and has the structural unit containing a thienyl group at each of those two terminals, and cases where the polymer (A) has three or more terminals, and has the structural unit containing a thienyl group at each of three or more of those three or more terminals.

Moreover, from the viewpoint of increasing the change in the degree of solubility of the composition, the polymer (A) preferably has the structural unit containing a thienyl group at all of the terminals, and the polymer (A) more preferably has three or more terminals and has the structural unit containing a thienyl group at all of those terminals. Ensuring that the polymer (A) has three or more terminals, namely has a branched structure, is also preferred from the viewpoints of enabling the weight average molecular weight to be increased, and enabling the glass transition temperature to be increased, thereby contributing to improved heat resistance.

(Structure)

Examples of partial structures contained in the polymer (A) are described below. However, the polymer (A) is not limited to polymers having the following partial structures. In the partial structures, "L" represents a divalent structural unit L, "B" represents a trivalent or higher structural unit B, and "T" represents a monovalent structural unit T. The symbol "*" indicates a bonding site with another structural unit. Each of the structural units L, B and T contains no alkyl groups of 5 or more carbon atoms within the structural unit.

Linear Polymers (A)

T-L-L-L-L-*               [Chemical formula 15]

Branched Polymer (A)

[Chemical formula 16]

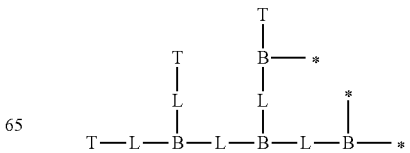

-continued

[structural diagrams with T, L, B units]

In the polymer (A), it is preferable that the structural unit L and/or the structural unit B contains at least one type of structural unit selected from the group consisting of structural units containing an aromatic amine structure and structural units containing a carbazole structure, and it is more preferable that the structural unit L and the structural unit B both contain at least one type of structural unit selected from the group consisting of structural units containing an aromatic amine structure and structural units containing a carbazole structure. Further, the structural unit T includes at least a structural unit containing a thienyl group which may have a substituent, and may also include at least one type of structural unit selected from the group consisting of structural units containing an aromatic amine structure and structural units containing a carbazole structure. The plurality of structural units L may be the same structural units or different structural units. This also applies for the structural units T and the structural units B.

(Optional Structural Units)

The structural unit L may also include an arbitrary divalent structural unit 1 other than the structural units containing an aromatic amine structure and the structural units containing a carbazole structure. Further, the structural unit B may also include an arbitrary trivalent or higher structural unit b other than the structural units containing an aromatic amine structure and the structural units containing a carbazole structure. The structural unit T may also include an arbitrary monovalent unit t other than the structural units containing a thienyl group, the structural units containing an aromatic amine structure, and the structural units containing a carbazole structure. These arbitrary structural units also contain no alkyl groups of 5 or more carbon atoms within the structural unit.

(Structural Unit 1)

The structural unit 1 is a divalent structural unit having charge transport properties. There are no particular limitations on the structural unit 1, provided the structural unit includes an atom grouping having the ability to transport a charge. For example, the structural unit 1 may be selected from among thiophene structures, fluorene structures, benzene structures, biphenyl structures, terphenyl structures, naphthalene structures, anthracene structures, tetracene structures, phenanthrene structures, dihydrophenanthrene structures, pyridine structures, pyrazine structures, quinoline structures, isoquinoline structures, quinoxaline structures, acridine structures, diazaphenanthrene structures, furan structures, pyrrole structures, oxazole structures, oxadiazole structures, thiazole structures, thiadiazole structures, triazole structures, benzothiophene structures, benzoxazole structures, benzoxadiazole structures, benzothiazole structures, benzothiadiazole structures, and benzotriazole structures, which may be substituted or unsubstituted, and structures containing one type, or two or more types, of the above structures.

Specific examples of the structural unit 1 are shown below. However, the structural unit 1 is not limited to the following structures.

[Chemical formula 17]

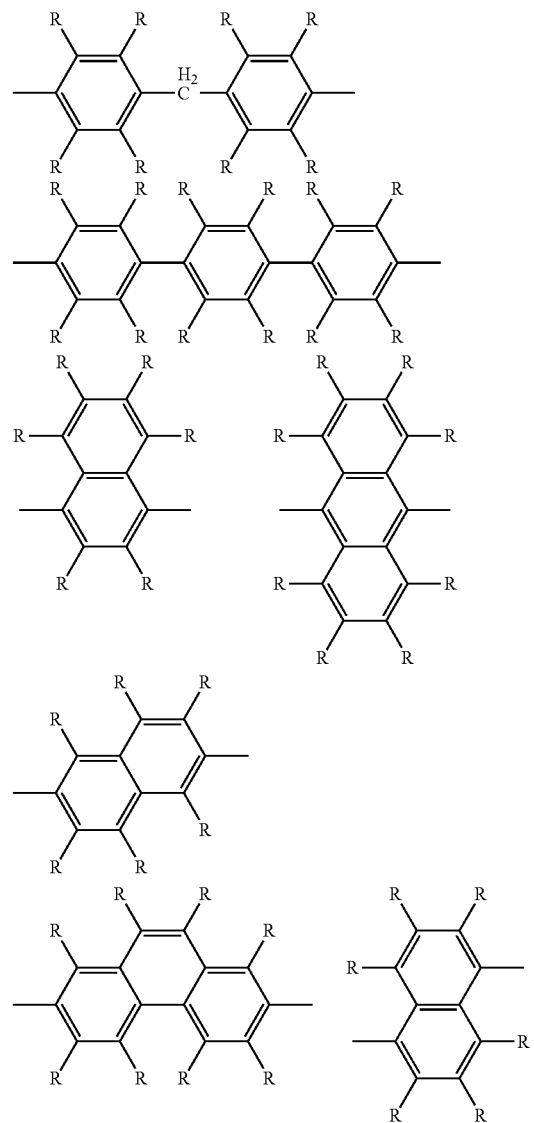

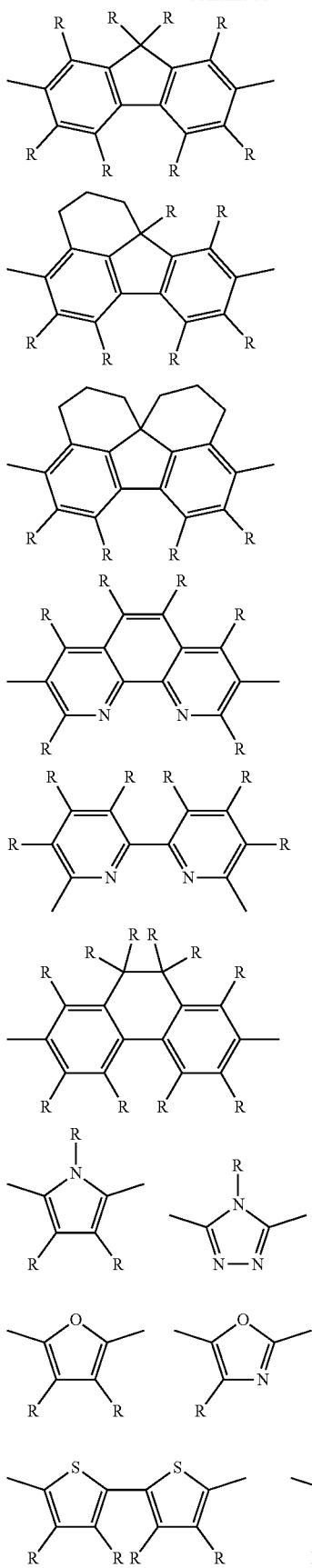

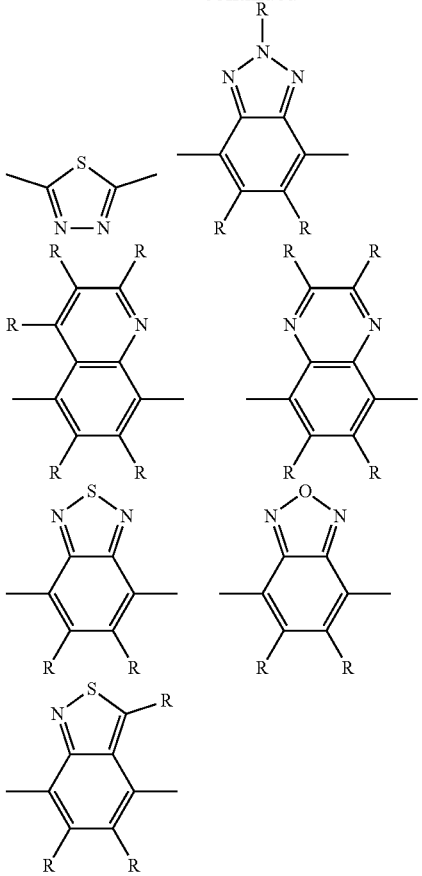

Each R independently represents a hydrogen atom or a substituent. It is preferable that each R is independently selected from a group consisting of —R', —OR², —OCOR⁴, —COOR⁵, —SiR⁶R⁷R⁸, and halogen atoms. Each of $R^1$ to $R^8$ independently represents a hydrogen atom; a linear, cyclic or branched alkyl group of 1 to 4 carbon atoms; or an aryl group or heteroaryl group of 2 to 30 carbon atoms. The alkyl group may be further substituted with an aryl group or heteroaryl group of 2 to 20 carbon atoms, and the aryl group or heteroaryl group may be further substituted with a linear, cyclic or branched alkyl group of 1 to 4 carbon atoms. R is preferably a hydrogen atom, an alkyl group, an aryl group, or an alkyl-substituted aryl group.

(Structural Unit b)

The structural unit b is a trivalent or higher structural unit that forms a branched portion in those cases where the polymer (A) has a branched structure. From the viewpoint of improving the durability of organic electronic elements, the structural unit b is preferably not higher than hexavalent, and is more preferably either trivalent or tetravalent. The structural unit b is preferably a unit that has charge transport properties. For example, from the viewpoint of improving the durability of organic electronic elements, the structural unit b is preferably selected from among substituted or unsubstituted condensed polycyclic aromatic hydrocarbon structures.

Specific examples of the structural unit b are shown below. However, the structural unit b is not limited to the following structures.

[Chemical formula 18]

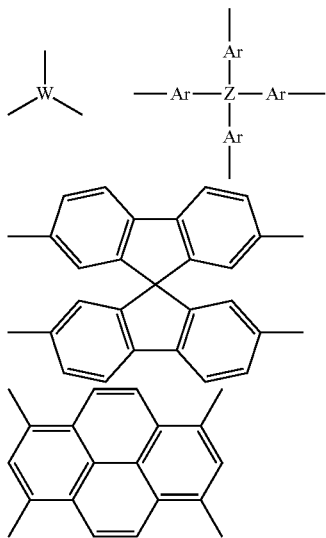

W represents a trivalent linking group, and for example, represents an arenetriyl group or heteroarenetriyl group of 2 to 30 carbon atoms. Each Ar independently represents a divalent linking group, and for example, represents an arylene group or heteroarylene group of 2 to 30 carbon atoms. Ar is preferably an arylene group, and more preferably a phenylene group. Z represents a carbon atom, a silicon atom or a phosphorus atom. In the above structural units, the benzene rings and Ar groups may have substituents, and examples of the substituents include the R groups in the structural unit 1.

(Structural Unit t)

The structural unit t is a monovalent structural unit that forms a terminal portion of the polymer (A). There are no particular limitations on the structural unit t, which may, for example, be selected from among aromatic hydrocarbon structures and aromatic heterocyclic structures (but excluding thienyl groups), which may be substituted or unsubstituted, and structures containing one type, or two or more types, of these structures. In one embodiment, from the viewpoint of imparting durability without impairing the charge transport properties, the structural unit t is preferably a substituted or unsubstituted aromatic hydrocarbon structure, and is more preferably a substituted or unsubstituted benzene structure.

A specific example of the structural unit t is shown below. However, the structural unit t is not limited to the following structure.

[Chemical formula 19]

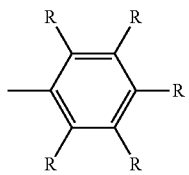

R is the same as R in the structural unit 1.

In the above description of structural units, an aryl group is an atom grouping in which one hydrogen atom has been removed from an aromatic hydrocarbon. A heteroaryl group is an atom grouping in which one hydrogen atom has been removed from an aromatic heterocycle. An arylene group is an atom grouping in which two hydrogen atoms have been removed from an aromatic hydrocarbon. A heteroarylene group is an atom grouping in which two hydrogen atoms have been removed from an aromatic heterocycle. An arenetriyl group is an atom grouping in which three hydrogen atoms have been removed from an aromatic hydrocarbon. A heteroarenetriyl is an atom grouping in which three hydrogen atoms have been removed from an aromatic heterocycle. Examples of the aromatic hydrocarbons include monocyclic rings, condensed rings, and polycyclic rings in which two or more rings selected from among monocyclic rings and condensed rings are bonded together via single bonds. Examples of the aromatic heterocycles include monocyclic rings, condensed rings, and polycyclic rings in which two or more rings selected from among monocyclic rings and condensed rings are bonded together via single bonds.

Examples of the aromatic hydrocarbons include benzene, biphenyl, terphenyl, triphenylbenzene, naphthalene, anthracene, tetracene, fluorene and phenanthrene. Examples of the aromatic heterocycles include pyridine, pyrazine, quinoline, isoquinoline, acridine, phenanthroline, furan, pyrrole, thiophene, carbazole, oxazole, oxadiazole, thiadiazole, triazole, benzoxazole, benzoxadiazole, benzothiadiazole, benzotriazole and benzothiophene.

(Alkyl Groups in the Polymer (A))

The polymer (A) contains no alkyl groups of 5 or more carbon atoms. In the polymer (A), the amount of alkyl groups of 5 or more carbon atoms, based on the total of all the structural units, is 0 mol %. Here, the "amount of alkyl groups of 5 or more carbon atoms" means the proportion of structural units having an alkyl group of 5 or more carbon atoms. If the polymer (A) contains an alkyl group of 5 or more carbon atoms, then the wetting properties of an organic layer formed using the polymer (A) tend to deteriorate. As a result, it is thought that a separate organic layer (upper layer) cannot be formed favorably by a coating method on top of the organic layer (lower layer), resulting in a deterioration in the characteristics of the organic electronic element.

Furthermore, in the polymer (A), from the viewpoints of improving the solubility of the polymer (A) and improving the characteristics of organic electronic elements, the amount of alkyl groups of 1 to 4 carbon atoms, based on the total of all the structural units, is preferably at least 30 mol %, more preferably at least 40 mol %, and even more preferably 50 mol % or greater. From the viewpoints of improving the characteristics of organic electronic elements and enabling favorable synthesis of branched polymers, the amount of alkyl groups of 1 to 4 carbon atoms, based on the total of all the structural units, is preferably not more than 90 mol %, more preferably not more than 80 mol %, and even more preferably 70 mol % or less. Here, the "amount of alkyl groups of 1 to 4 carbon atoms" means the proportion of structural units having an alkyl group of 1 to 4 carbon atoms.

If the polymer (A) contains alkyl groups of 1 to 4 carbon atoms, then when the composition includes a solvent, the solubility of the polymer (A) in the solvent improves, and a homogenous composition can be obtained. By using this composition, a favorable organic layer can be formed. It is thought that, as a result, the characteristics of the organic electronic element can be improved.

(Number Average Molecular Weight)

The number average molecular weight of the polymer (A) can be adjusted appropriately with due consideration of the solubility in solvents and the film formability and the like. From the viewpoint of ensuring superior charge transport properties, the number average molecular weight is preferably at least 500, more preferably at least 1,000, and even more preferably 2,000 or greater. From the viewpoints of maintaining favorable solubility in solvents and facilitating the preparation of ink compositions, the number average molecular weight is preferably not more than 1,000,000, more preferably not more than 100,000, and even more preferably 50,000 or less.

(Weight Average Molecular Weight)

The weight average molecular weight of the polymer (A) can be adjusted appropriately with due consideration of the solubility in solvents and the film formability and the like. From the viewpoint of ensuring superior charge transport properties, the weight average molecular weight is preferably at least 1,000, more preferably at least 5,000, and even more preferably 10,000 or greater. From the viewpoints of maintaining favorable solubility in solvents and facilitating the preparation of ink compositions, the weight average molecular weight is preferably not more than 1,000,000, more preferably not more than 700,000, and even more preferably 400,000 or less.

The number average molecular weight and the weight average molecular weight can be measured by gel permeation chromatography (GPC), using a calibration curve of standard polystyrenes.

(Proportions of Structural Units)

In those cases where the polymer (A) includes a structural unit L, from the viewpoint of obtaining satisfactory charge transport properties, the proportion of the structural unit L, based on the total of all the structural units, is preferably at least 10 mol %, more preferably at least 20 mol %, and even more preferably 30 mol % or higher. If the structural unit T and the optionally introduced structural unit B are also taken into consideration, then the proportion of the structural unit L is preferably not more than 95 mol %, more preferably not more than 90 mol %, and even more preferably 85 mol % or less.

From the viewpoint of obtaining superior charge transport properties, the total proportion of structural units containing an aromatic amine structure and structural units containing a carbazole structure as the structural unit L, based on the total of all the structural units L, is preferably at least 50 mol %, more preferably at least 70 mol %, and even more preferably 90 mol % or greater. The upper limit may be 100 mol %.

In those cases where the polymer (A) includes a structural unit B, from the viewpoint of improving the durability of organic electronic elements, the proportion of the structural unit B, based on the total of all the structural units, is preferably at least 1 mol %, more preferably at least 5 mol %, and even more preferably 10 mol % or higher. From the viewpoints of suppressing any increase in viscosity and enabling more favorable synthesis of the polymer (A), and from the viewpoint of ensuring satisfactory charge transport properties, the proportion of the structural unit B is preferably not more than 50 mol %, more preferably not more than 40 mol %, and even more preferably 30 mol % or less.

From the viewpoint of obtaining superior charge transport properties, the total proportion of structural units containing an aromatic amine structure and structural units containing a carbazole structure as the structural unit B, based on the total of all the structural units B, is preferably at least 50 mol %, more preferably at least 70 mol %, and even more preferably 90 mol % or greater. The upper limit may be 100 mol %.

From the viewpoint of improving the characteristics of organic electronic elements, and from the viewpoint of suppressing any increase in viscosity and enabling more favorable synthesis of the polymer (A), the proportion of the structural unit T contained in the polymer (A), based on the total of all the structural units, is preferably at least 5 mol %, more preferably at least 10 mol %, and even more preferably 15 mol % or higher. From the viewpoint of obtaining satisfactory charge transport properties, the proportion of the structural unit T is preferably not more than 60 mol %, more preferably not more than 55 mol %, and even more preferably 50 mol % or less.

From the viewpoint of ensuring a satisfactory change in the degree of solubility of the composition, the proportion of structural units containing a thienyl group as the structural unit T, based on the total of all the structural units T, is preferably at least 20 mol %, more preferably at least 50 mol %, and even more preferably 70 mol % or greater. The upper limit may be 100 mol %.

Considering the balance between the charge transport properties, the durability and the productivity and the like, the ratio (molar ratio) between the structural unit L and the structural unit T is preferably L:T=100:(1 to 70), more preferably 100:(3 to 50), and even more preferably 100:(5 to 30). Further, in those cases where the charge transport polymer also contains a structural unit B, the ratio (molar ratio) between the structural unit L, the structural unit T and the structural unit B is preferably L:T:B=100:(10 to 200):(10 to 100), more preferably 100:(20 to 180):(20 to 90), and even more preferably 100:(40 to 160):(30 to 80).

The proportion of alkyl groups of 5 or more carbon atoms, the proportion of alkyl groups of 1 to 4 carbon atoms, and the proportion of each structural unit can be determined using the amount added of the monomer corresponding with each structural unit during synthesis of the polymer (A). Further, the proportion of each structural unit can also be calculated as an average value using the integral of the spectrum attributable to the structural unit in the $^1$H-NMR spectrum of the polymer (A). In terms of ease of calculation, if the amounts added are clear, then the proportion of the structural unit preferably employs the value determined using the amount added of the corresponding monomer.

(Surface Free Energy)

The polymer (A) has a surface free energy, represented by the sum of a polar component and a non-polar component determined by the Owens-Wendt method, that is preferably 41 mJ m$^2$ or greater. The surface free energy is more preferably 42 mJ/m$^2$ or greater. Ensuring that the polymer (A) has a large surface free energy improves the wetting properties of an organic layer (lower layer) formed using the polymer (A). It is thought that, as a result, a favorable organic layer (upper layer) can be formed on top of the organic layer (lower layer), and the characteristics of the organic electronic element can be improved.

From the viewpoint of enabling the formation of a favorable organic layer, the surface free energy is preferably not more than 50 mJ/m$^2$, and is more preferably 45 mJ/m$^2$ or less.

The surface free energy of the polymer (A) prescribed in the present embodiment describes the surface free energy of a polymer film formed using the polymer (A). As shown by formula (1) below, the surface free energy is represented by the sum of a polar component and a non-polar component based on the Owens-Wendt method.

[Numerical formula 1]

Surface free energy (γ)=polar component ($\gamma_p$)+non-polar component ($\gamma_d$)     (1)

[Numerical formula 1]

Surface free energy (γ)=polar component ($\gamma_p$)+non-polar component ($\gamma_d$)     (1)

According to Young's equation, the relationship between the contact angle between a liquid and a solid and the surface free energy can be represented by formula (2) below. In this formula, $\gamma_S$ represents the surface free energy of the solid, $\gamma_L$ represents the surface free energy of the liquid, $\gamma_{LS}$ represents the liquid/solid interfacial free energy, and θ represents the contact angle.

[Numerical formula 2]

$$\gamma_S = \gamma_{LS} + \gamma_L \cos\theta \quad (2)$$

When two substances such as a solid and a liquid make contact, the surface free energies of the substances decrease as a result of the contact, and as indicated in formula (3) below, it is postulated that the resulting surface free energy can be represented by the sum of the geometric means of the corresponding surface free energies. The subscripts p and d indicate that the respective surface free energies are a polar component (p) or a non-polar component (d) respectively.

[Numerical formula 3]

$$\gamma_{LS} = \gamma_S + \gamma_L - 2\sqrt{\gamma_{Sp}\gamma_{Lp}} - 2\sqrt{\gamma_{Sd}\gamma_{Ld}} \quad (3)$$

By eliminating $\gamma_u$ from the above formulas (2) and (3), formula (4) below is obtained.

[Numerical formula 4]

$$\gamma_L(1+\cos\theta)/2 = \sqrt{\gamma_{Sp}\gamma_{Lp}} + \sqrt{\gamma_{Sd}\gamma_{Ld}} \quad (4)$$

Accordingly, by measuring the contact angle of a solvent having a known surface free energy, the above formula (4) can be used to calculate the surface free energy of a polymer film. In other words, two different types of liquid droplets of water and diiodomethane are dripped onto the polymer film, and the respective contact angles are measured. Water has a polar component of 51.0 mJ/m² and a non-polar component of 21.8 mJ/m², whereas diiodomethane has a polar component of 1.3 mJ/m² and a non-polar component of 49.5 mJ/m². Accordingly, by inserting the two contact angles and solving the simultaneous equations, the surface free energy (polar component, non-polar component) of the polymer film can be calculated.

More specifically, the simultaneous equations are represented by formula (5) and formula (6) shown below.

[Numerical formula 5]

$$\gamma_{LM}(1+\cos\theta_M)/2 = (\gamma_{sp}\gamma_{LpM})^{0.5} + (\gamma_{sd}\gamma_{LdM})^{0.5} \quad (5)$$

$$\gamma_{LW}(1+\cos\theta_W)/2 = (\gamma_{sp}\gamma_{LpM})^{0.5} + (\gamma_{sd}\gamma_{LdM})^{0.5} \quad (6)$$

In formula (5) and formula (6):

$\gamma_{LpM}$ represents the polar component of the surface free energy of diiodomethane, $\gamma_{LdM}$ represents the non-polar component of the surface free energy of diiodomethane, $\gamma_{LM}$ represents the surface free energy of diiodomethane ($=\gamma_{LpM}+\gamma_{LdM}$), $\theta_M$ represents the contact angle of diiodomethane on the polymer film, $\gamma_{LpW}$ represents the polar component of the surface free energy of water, $\gamma_{LdW}$ represents the non-polar component of the surface free energy of water, $\gamma_{LW}$ represents the surface free energy of water ($=\gamma_{LpW}+\gamma_{Ldw}$), $\theta_W$ represents the contact angle of water on the polymer film, $\gamma_{sp}$ represents the polar component of the surface free energy of the polymer film, and $\gamma_{sd}$ represents the non-polar component of the surface free energy of the polymer film.

The contact angle on the polymer film refers to the angle obtained by forming a polymer film of the polymer (A) using a solution containing only the polymer (A) and a solvent, and then measuring the contact angle on the formed polymer film. The method used for measuring the contact angle on the polymer film may, for example, follow the method described in the examples.

(Production Method)

The polymer (A) can be produced by various synthesis methods, and there are no particular limitations. For example, conventional coupling reactions such as the Suzuki coupling, Negishi coupling, Sonogashira coupling, Stille coupling and Buchwald-Hartwig coupling reactions can be used. The Suzuki coupling is a reaction in which a cross-coupling reaction is initiated between an aromatic boronic acid derivative and an aromatic halogen compound using a Pd catalyst. By using a Suzuki coupling, the polymer (A) can be produced easily by bonding together the desired aromatic rings.

In the coupling reaction, a Pd(0) compound, Pd(II) compound, or Ni compound or the like is used as a catalyst. Further, a catalyst species generated by mixing a precursor such as tris(dibenzylideneacetone)dipalladium(0) or palladium(II) acetate with a phosphine ligand can also be used.

[Initiator (B)]

The initiator (B) is used for changing the degree of solubility of the composition. Substances that act as oxidizing agents within the composition can be used as the initiator (B). Using a substance that can act as an oxidizing agent relative to the polymer (A) is preferred from the viewpoint of improving the hole transport properties. From the viewpoint of changing the degree of solubility of the composition, an onium salt containing a cation and an anion is preferred as the initiator (B), and examples of such onium salts are described below.

[Cation]

Examples of the cation include H⁺, a carbenium ion, ammonium ion, anilinium ion, pyridinium ion, imidazolium ion, pyrrolidinium ion, quinolinium ion, imonium ion, aminium ion, oxonium ion, pyrylium ion, chromenylium ion, xanthylium ion, iodonium ion, sulfonium ion, phosphonium ion, tropylium ion and cations having a transition metal, and of these, a carbenium ion, ammonium ion, anilinium ion, aminium ion, iodonium ion, sulfonium ion or tropylium ion is preferred. From the viewpoint of achieving a favorable combination of change in the degree of solubility and storage stability for the composition, an ammonium ion, anilinium ion, iodonium ion or sulfonium ion is more preferred.

[Anion]

Examples of the anion include halogen ions such as F⁻, Cl⁻, Br⁻ and I⁻; OH⁻; $ClO_4^-$; sulfonate ions such as $FSO_3^-$, $ClSO_3^-$, $CH_3SO_3^-$, $C_6H_5SO_3^-$ and $CF_3SO_3^-$; sulfate ions such as $HSO_4^-$ and $SO_4^{2-}$; carbonate ions such as $HCO_3^-$ and $CO_3^{2-}$; phosphate ions such as $H_2PO_4^-$, $HPO_4^{2-}$ and $PO_4^{3-}$; fluorophosphate ions such as $PF_6^-$ and $PF_5OH^-$; fluoroalkyl fluorophosphate ions such as $[(CF_3CF_2)_3PF_3]^-$, $[(CF_3CF_2CF_2)_3PF_3]^-$, $[((CF_3)_2CF)_3PF_3]^-$, $[((CF_3)_2CF)_2PF_4]^-$, $[((CF_3)_2CFCF_2)_3PF_3]^-$ and $[((CF_3)_2CFCF_2)_2PF_4]^-$; fluoroalkane sulfonyl methide and imide ions such as $(CF_3SO_2)_3C^-$ and $(CF_3SO_2)_2N^-$; borate ions such as $BF_4^-$, $B(C_6H_5)_4^-$ and $B(C_6H_4CF_3)_4^-$; fluoroantimonate ions such as $SbF_6^-$ and $SbF_5OH^-$; fluoroarsenate ions such as $AsF_6^-$ and $AsF_5OH^-$; $AlCl_4^-$ and $BiF_6^-$. From the viewpoint of the change in the degree of solubility of the composition when used in combination with the cation described above, fluorophosphate ions such as $PF_6^-$ and $PF_5OH^-$; fluoroalkyl fluorophosphate ions such as $[(CF_3CF_2)_3PF_3]^-$, $[(CF_3CF_2CF_2)_3PF_3]^-$, $[((CF_3)_2CF)_3PF_3]^-$, $[((CF_3)_2CF)_2PF_4]^-$, $[((CF_3)_2CFCF_2)_3PF_3]^-$ and $[((CF_3)_2CFCF_2)_2PF_4]^-$; fluoroalkane sulfonyl methide and imide ions such as $(CF_3SO_2)_3C^-$ and $(CF_3SO_2)_2N$; borate ions such as $BF_4^-$, $B(C_6H_5)_4^-$ and $B(C_6H_4CF_3)_4^-$; and fluoroantimonate ions such as $SbF_6^-$ and $SbF_5OH^-$ are preferred, and among these, a borate ion is particularly desirable.

More specifically, an initiator containing one type of cation selected from among an ammonium ion, anilinium ion, iodonium ion and sulfonium ion, and one type of anion selected from among fluorophosphate ions, fluoroalkyl fluorophosphate ions, fluoroalkane sulfonyl methide and imide ions, borate ions and fluoroantimonate ions is preferred. An initiator containing an ammonium ion and a borate ion is particularly preferred. Specific examples of the anion and cation incorporated within these preferred initiators are not limited to those mentioned above, and conventional anions and cations may also be used.

[Solvent (C)]

The composition may also contain a solvent. Solvents that enable a coating layer to be formed using the composition may be used as the solvent, and a solvent that is capable of dissolving the polymer (A) and the initiator (B) is preferably used.

Examples of the solvent include water; alcohols such as methanol, ethanol and isopropyl alcohol; alkanes such as pentane, hexane and octane; cyclic alkanes such as cyclohexane; aromatic hydrocarbons such as benzene, toluene, xylene, mesitylene, tetralin and diphenylmethane; aliphatic ethers such as ethylene glycol dimethyl ether, ethylene glycol diethyl ether and propylene glycol-1-monomethyl ether acetate; aromatic ethers such as 1,2-dimethoxybenzene, 1,3-dimethoxybenzene, anisole, phenetole, 2-methoxytoluene, 3-methoxytoluene, 4-methoxytoluene, 2,3-dimethylanisole and 2,4-dimethylanisole; aliphatic esters such as ethyl acetate, n-butyl acetate, ethyl lactate and n-butyl lactate; aromatic esters such as phenyl acetate, phenyl propionate, methyl benzoate, ethyl benzoate, propyl benzoate and n-butyl benzoate; amide-based solvents such as N,N-dimethylformamide and N,N-dimethylacetamide; as well as dimethyl sulfoxide, tetrahydrofuran, acetone, chloroform and methylene chloride. Preferred solvents include aromatic hydrocarbons, aliphatic esters, aromatic esters, aliphatic ethers, and aromatic ethers.

[Optional Components]

The composition may also contain a charge transport low-molecular weight compound, or another polymer or the like.

[Contents]

The composition may contain only one type of the polymer (A), or may contain two or more types. From the viewpoint of obtaining favorable charge transport properties, the amount of the polymer (A), relative to the total mass of the composition (but excluding any solvent), is preferably at least 50% by mass, more preferably at least 70% by mass, and even more preferably 80% by mass or greater. Further, considering the amount of the initiator (B), the amount of the polymer (A), relative to the total mass of the composition (but excluding any solvent), is preferably not more than 99.99% by mass, more preferably not more than 99.9% by mass, and even more preferably 99.5% by mass or less.

The composition may contain only one type of the initiator (B), or may contain two or more types. From the viewpoint of ensuring a satisfactory change in the degree of solubility, the amount of the initiator (B), relative to the total mass of the composition (but excluding any solvent), is preferably at least 0.01% by mass, more preferably at least 0.1% by mass, and even more preferably 0.5% by mass or greater. Furthermore, from the viewpoint of maintaining favorable film formability, the amount of the initiator (B), relative to the total mass of the composition (but excluding any solvent), is preferably not more than 50% by mass, more preferably not more than 30% by mass, and even more preferably 20% by mass or less.

The composition may contain only one type of the solvent (C), or may contain two or more types. The amount of the solvent (C) may be determined with due consideration of the use of the composition in various coating methods. For example, the amount of the solvent is preferably an amount that yields a ratio of the polymer (A) relative to the solvent that is at least 0.1% by mass, more preferably at least 0.2% by mass, and even more preferably 0.5% by mass or greater. Further, the amount of the solvent is preferably an amount that yields a ratio of the polymer (A) relative to the solvent that is not more than 10% by mass, more preferably not more than 5% by mass, and even more preferably 3% by mass or less.

[Changing Degree of Solubility]

The degree of solubility of the composition can be changed by light irradiation and/or heating, and therefore the same solvent can be used for stacking layers using coating methods. For the light irradiation, for example, light having a wavelength of 200 to 800 nm can be used. Further, the heating temperature is preferably from 60 to 300° C., more preferably from 80 to 250° C., and even more preferably from 100 to 220° C. The heating time is preferably from 10 seconds to 2 hours, more preferably from 1 minute to 1 hour, and even more preferably from 1 to 10 minutes.

Although the mechanism by which the degree of solubility of the composition changes is not entirely clear, in one example of a possible mechanism, it is surmised that the thienyl groups form a bond, for example by thienyl groups forming a covalent bond in the presence of light and/or heat and under the action of the initiator, thereby changing the degree of solubility of the composition. The polymer (A) may have other groups that can form bonds, such as groups with a carbon-carbon double bond or groups having a small ring, but from the viewpoint of improving the element characteristics, the polymer (A) may have no groups capable of forming bonds other than the thienyl group. Because the composition is able to undergo a change in the degree of solubility, in one embodiment, the composition may be used as a curable resin composition.

When performing multilayering of organic layers, the size of the change in the degree of solubility of the composition in solvents is preferably as large as possible. Confirmation as to whether or not "the degree of solubility of the composition changes" can be made by ascertaining whether or not the degree of solubility in solvents of an organic layer formed using the composition changes upon the application of light and/or heat. Specifically, first, the composition containing the polymer or oligomer (A), the initiator (B) and a solvent (1) is used to form an organic layer (1) by a coating method. Following an optional drying step, light and/or heat is applied to the organic layer (1), thus obtaining an organic layer (2). Subsequently, the organic layer (2) is brought into contact with a solvent (2), thus obtaining an organic layer (3). The larger the thickness of the organic layer (3), the greater the size of the change in the degree of solubility of the composition. In other words, the ratio between the thickness of the organic layer (3) relative to the thickness of the organic layer (2) (namely, the residual ratio of the organic layer) is preferably large. The residual ratio can be determined from the ratio between the thickness measurement values for the organic layer (2) and the organic layer (3), or from the ratio between the absorbance measurement values for the organic layer (2) and the organic layer (3).

At this time, the solvent (2) may be the same solvent as the solvent (1), or the solvent that has the largest weight ratio within the solvent (1) in those cases where the solvent (1) is a mixed solvent, or alternatively, toluene may be used. Using toluene is simple.

Because the composition of the present embodiment contains the polymer (A) which has a structural unit containing an aromatic amine structure and/or a structural unit containing a carbazole structure, the composition can be used favorably as a hole transport material composition used in forming an organic electronic element such as an organic EL element or an organic photoelectric conversion element or the like.

<Hole Transport Material Composition>

A hole transport material composition that represents an embodiment of the present invention contains the composition of the embodiment described above. The hole transport material composition contains the polymer (A) and the initiator (B). The hole transport material composition may also contain a low-molecular weight compound and/or a substance that functions as a dopant or the like.

<Ink Composition>

An ink composition that represents an embodiment of the present invention contains the composition of the embodiment described above. The ink composition contains the polymer (A) and the initiator (B), and generally contains a solvent capable of dissolving and or dispersing these components. By using the ink composition, an organic layer can be formed easily by a simple coating method.

<Organic Layer and Method for Producing Organic Layer>

An organic layer that represents an embodiment of the present invention is formed by applying the composition, the hole transport material composition or the ink composition of one of the embodiments described above, and subsequently applying heat, light, or both heat and light. Further, a method for producing an organic layer that represents another embodiment of the present invention includes a step of forming a coating layer by applying the composition, the hole transport material composition or the ink composition of one of the embodiments described above, and a step of applying heat, light, or both heat and light to the coating layer.

Examples of the method used for applying the composition include conventional methods such as inkjet methods, casting methods, dipping methods, printing methods such as relief printing, intaglio printing, offset printing, lithographic printing, relief reversal offset printing, screen printing and gravure printing, and spin-coating methods. The application step is typically conducted in a temperature range from −20 to +300° C., preferably from 10 to 100° C., and particularly preferably from 15 to 50° C. Following application, the obtained coating layer may be dried using a hot plate or an oven to remove the solvent at a temperature that is typically within a range from 60 to 300° C., preferably from 80 to 250° C., and particularly preferably from 100 to 220° C. The drying time is typically from 10 seconds to 2 hours, preferably from 1 minute to 1 hour, and particularly preferably from 1 to 10 minutes.

By applying heat, light, or both heat and light to the coating layer formed by application, an organic layer having a different degree of solubility from that prior to the application of heat and/or light can be obtained. Because this organic layer has low solubility in solvents, a coating solution may be used to easily form a separate organic layer on top of the organic layer of the present embodiment.

For the light irradiation, a light source such as a low-pressure mercury lamp, medium-pressure mercury lamp, high-pressure mercury lamp, ultra-high-pressure mercury lamp, metal halide lamp, xenon lamp, fluorescent lamp, light-emitting diode or sunlight may be used, whereas the heating may be performed on a hot plate or in an oven.

The thickness of the organic layer may be set as appropriate depending on the application. From the viewpoint of improving the charge transport efficiency, the thickness is preferably at least 0.1 nm, more preferably at least 1 nm, and even more preferably 3 nm or greater. Further, form the viewpoint of reducing the electrical resistance, the thickness of the organic layer is preferably not more than 300 nm, more preferably not more than 200 nm, and even more preferably 100 nm or less.

<Organic Electronic Element>

An organic electronic element that represents one embodiment of the present invention has at least an organic layer of the embodiment described above. Examples of the organic electronic element include an organic EL element, an organic photoelectric conversion element, and an organic transistor and the like. The organic electronic element preferably has at least a structure in which the organic layer is disposed between a pair of electrodes.

[Organic EL Element]

An organic EL element that represents one embodiment of the present invention has at least an organic layer of the embodiment described above. The organic EL element typically includes a light-emitting layer, an anode, a cathode and a substrate, and if necessary, also includes other functional layers such as a hole injection layer, electron injection layer, hole transport layer or electron transport layer. Each layer may be formed by a vapor deposition method, or by a coating method. The organic EL element preferably has the organic layer as the light-emitting layer or as another functional layer, more preferably has the organic layer as a functional layer, and even more preferably has the organic layer as at least one of a hole injection layer and a hole transport layer.

The FIGURE is a cross-sectional schematic view illustrating one embodiment of the organic EL element. The organic EL element in the FIGURE is an element having a multilayer structure, and includes a substrate 8, an anode 2, a hole injection layer 3 formed from an organic layer of the embodiment described above, a hole transport layer 6, a light-emitting layer 1, an electron transport layer 7, an electron injection layer 5 and a cathode 4 formed in that order. Each of these layers is described below.

[Light-Emitting Layer]

Examples of the materials that can be used for the light-emitting layer include light-emitting materials such as low-molecular weight compounds, polymers, and dendrimers and the like. Polymers exhibit good solubility in solvents, meaning they are suitable for coating methods, and are consequently preferred. Examples of the light-emitting material include fluorescent materials, phosphorescent materials, and thermally activated delayed fluorescent materials (TADF).

Specific examples of the fluorescent materials include low-molecular weight compounds such as perylene, coumarin, rubrene, quinacridone, stilbene, color laser dyes, aluminum complexes, and derivatives of these compounds; polymers such as polyfluorene, polyphenylene, polyphenylenevinylene, polyvinylcarbazole, fluorene-benzothiadiazole copolymers, fluorene-triphenylamine copolymers, and derivatives of these compounds; and mixtures of the above materials.

Examples of materials that can be used as the phosphorescent materials include metal complexes and the like containing a metal such as Ir or Pt or the like. Specific examples of Ir complexes include FIr(pic) (iridium(III) bis[(4,6-difluorophenyl)-pyridinato-N,$C^2$]picolinate) which emits blue light, Ir(ppy)$_3$ (fac-tris(2-phenylpyridine)iridium) which emits green light, and (btp)$_2$Ir(acac) (bis[2-(2'-benzo[4,5-α]thienyl)pyridinato-N,$C^3$]iridium(acetyl-acetonate)) and Ir(piq)$_3$ (tris(1-phenylisoquinoline)iridium) which emit red light. Specific examples of Pt complexes include PtOEP (2,3,7,8,12,13,17,18-octaethyl-21H,23H-porphyrin-platinum) which emits red light.

When the light-emitting layer contains a phosphorescent material, a host material is preferably also included in addition to the phosphorescent material. Low-molecular weight compounds, polymers, and dendrimers can be used as this host material. Examples of the low-molecular weight compounds include CBP (4,4'-bis(9H-carbazol-9-yl)-biphenyl), mCP (1,3-bis(9-carbazolyl)benzene), CDBP (4,4'-bis(carbazol-9-yl)-2,2'-dimethylbiphenyl), and derivatives of these compounds, whereas examples of the polymers include the compositions of the above embodiment, polyvinylcarbazole, polyphenylene, polyfluorene, and derivatives of these polymers.

Examples of the thermally activated delayed fluorescent materials include the compounds disclosed in Adv. Mater., 21, 4802-4906 (2009); Appl. Phys. Lett., 98, 083302 (2011); Chem. Comm., 48, 9580 (2012); Appl. Phys. Lett., 101, 093306 (2012); J. Am. Chem. Soc., 134, 14706 (2012); Chem. Comm., 48, 11392 (2012); Nature, 492, 234 (2012); Adv. Mater., 25, 3319 (2013); J. Phys. Chem. A, 117, 5607 (2013); Phys. Chem. Chem. Phys., 15, 15850 (2013); Chem. Comm., 49, 10385 (2013); and Chem. Lett., 43, 319 (2014) and the like.

[Hole Injection Layer, Hole Transport Layer]

The organic layer formed using one of the compositions described above is preferably used as at least one of a hole injection layer and a hole transport layer, and is more preferably used as at least a hole injection layer. In those cases where the organic EL element contains an organic layer formed using one of the compositions described above as a hole injection layer, and also contains a hole transport layer, a conventional material may be used for the hole transport layer. Further, in those cases where the organic EL element contains an organic layer formed using one of the compositions described above as a hole transport layer, and also contains a hole injection layer, a conventional material may be used for the hole injection layer. Moreover, the organic EL element may have the organic layer as a hole injection and transport layer, or may have two of the organic layers as a hole injection layer and a hole transport layer respectively.

[Electron Transport Layer, Electron Injection Layer]

Examples of materials that can be used in the electron transport layer and electron injection layer include phenanthroline derivatives, bipyridine derivatives, nitro-substituted fluorene derivatives, diphenylquinone derivatives, thiopyran dioxide derivatives, condensed-ring tetracarboxylic acid anhydrides of naphthalene and perylene and the like, carbodiimides, fluorenylidenemethane derivatives, anthraquinodimethane and anthrone derivatives, oxadiazole derivatives, thiadiazole derivatives, benzimidazole derivatives, quinoxaline derivatives, and aluminum complexes. Further, the composition of the embodiment described above may also be used.

[Cathode]

Examples of the cathode material include metals or metal alloys, such as Li, Ca, Mg, Al, In, Cs, Ba, Mg/Ag, LiF and CsF.

[Anode]

Metals (for example, Au) or other materials having conductivity can be used as the anode material. Examples of the other materials include oxides (for example, ITO: indium oxide/tin oxide, and conductive polymers (for example, polythiophene-polystyrene sulfonate mixtures (PEDOT: PSS)).

[Substrate]

Glass and plastics and the like can be used as the substrate. The substrate is preferably transparent, and a substrate having flexibility is preferred. Quartz glass and light-transmitting resin films and the like can be used particularly favorably.

Examples of the resin films include films containing polyethylene terephthalate, polyethylene naphthalate, polyethersulfone, polyetherimide, polyetheretherketone, polyphenylene sulfide, polyarylate, polyimide, polycarbonate, cellulose triacetate or cellulose acetate propionate.

In those cases where a resin film is used, an inorganic substance such as silicon oxide or silicon nitride may be coated onto the resin film to inhibit the transmission of water vapor and oxygen and the like.

[Emission Color]

There are no particular limitations on the emission color from the organic EL element. White organic EL elements can be used for various illumination fixtures, including domestic lighting, in-vehicle lighting, watches and liquid crystal backlights, and are consequently preferred.

The method used for forming a white organic EL element may involve using a plurality of light-emitting materials to emit a plurality of colors simultaneously, and then mixing the emitted colors to obtain a white light emission. There are no particular limitations on the combination of the plurality of emission colors, and examples include combinations that include three maximum emission wavelengths for blue, green and red, and combinations that include two maximum emission wavelengths such as blue and yellow, or yellowish green and orange. Control of the emission color can be achieved by appropriate adjustment of the types and amounts of the light-emitting materials.

<Display Element, Illumination Device, Display Device>

A display element that represents one embodiment of the present invention contains the organic EL element of the embodiment described above. For example, by using the organic EL element as the element corresponding with each color pixel of red, green and blue (RGB), a color display element can be obtained. Examples of the image formation method include a simple matrix in which organic EL elements arrayed in a panel are driven directly by an electrode arranged in a matrix, and an active matrix in which a thin-film transistor is positioned on, and drives, each element.

Further, an illumination device that represents one embodiment of the present invention contains the organic EL element of the embodiment described above. Moreover, a display device that represents another embodiment of the present invention contains the illumination device and a liquid crystal element as a display unit. For example, the display device may be a device that uses the illumination device according to an embodiment of the present invention as a backlight, and uses a conventional liquid crystal element as the display unit, namely a liquid crystal display device.

EXAMPLES

The present invention is described below in further detail using a series of examples, but the present invention is not limited by the following examples.

[Synthesis of Hole Transport Polymers]

<Preparation of Pd Catalyst>

In a glove box under a nitrogen atmosphere at room temperature, tris(dibenzylideneacetone)dipalladium (73.2 mg, 80 μmop was weighed into a sample tube, toluene (15 mL) was added, and the resulting mixture was agitated for 30 minutes. In a similar manner, tris(t-butyl)phosphine (129.6 mg, 640 μmop was weighed into a sample tube, toluene (5 mL) was added, and the resulting mixture was agitated for 5 minutes. These two solutions were then mixed together and stirred for 30 minutes at room temperature to obtain a catalyst. All the solvents used were deaerated by nitrogen bubbling for at least 30 minutes prior to use.

<Synthesis of Hole Transport Polymer 1>

A three-neck round-bottom flask was charged with a monomer A1 (2.0 mmol), a monomer B1 (5.0 mmol), a monomer C1 (4.0 mmol), methyltri-n-octylammonium chloride (Aliquat 336, manufactured by Alfa Aesar, Inc.) (0.03 g), potassium hydroxide (1.12 g), pure water (5.54 mL) and toluene (50 mL), and the prepared Pd catalyst solution (3.0 mL) was then added. All of the solvents were deaerated by nitrogen bubbling for at least 30 minutes prior to use. The resulting mixture was heated and refluxed for 2 hours. All the operations up to this point were conducted under a stream of nitrogen.

[Chemical formula 20]

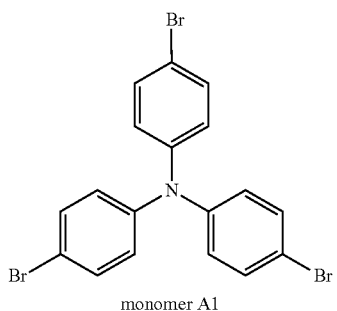

monomer A1

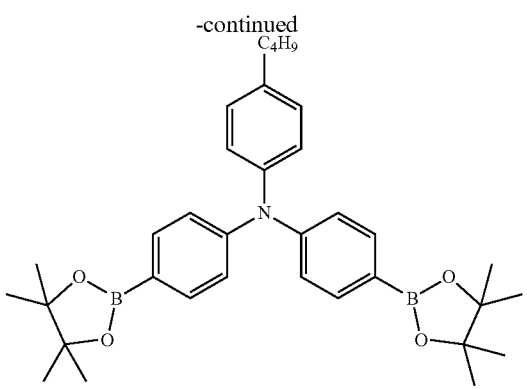

monomer B1

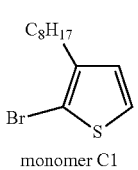

monomer C1

After completion of the reaction, the organic layer was washed with water, and the organic layer was then poured into methanol-water (9:1). The resulting precipitate was collected by filtration under reduced pressure, and then washed with methanol. The thus obtained precipitate was dissolved in toluene and re-precipitated from methanol. The obtained precipitate was collected by filtration under reduced pressure and then dissolved in toluene, and a metal adsorbent ("Triphenylphosphine, polymer-bound on styrene-divinylbenzene copolymer", manufactured by Strem Chemicals Inc., 200 mg per 100 mg of the precipitate) was then added to the solution and stirred overnight. Following completion of the stirring, the metal adsorbent and other insoluble matter were removed by filtration, and the filtrate was concentrated using a rotary evaporator. The concentrate was dissolved in toluene, and then re-precipitated from methanol. The thus produced precipitate was collected by filtration under reduced pressure and washed with methanol. The resulting precipitate was then dried under vacuum to obtain a hole transport polymer 1. Molecular weights were measured by GPC (relative to polystyrene standards) using THF as the eluent. The obtained hole transport polymer 1 had a number average molecular weight of 12,000 and a weight average molecular weight of 64,500.

The measurement conditions for the number average molecular weight and the weight average molecular weight were as follows.

Apparatus: High-performance liquid chromatograph "Prominence", manufactured by Shimadzu Corporation Feed pump (LC-20AD)

Degassing unit (DGU-20A)

Autosampler (SIL-20AHT)

Column oven (CTO-20A)

PDA detector (SPD-M20A)

Refractive index detector (RID-20A)

Columns:

Gelpack (a registered trademark)

GL-A160S (product number: 686-1J27)

GL-A150S (product number: 685-1J27) manufactured by Hitachi Chemical Co., Ltd.

Eluent: Tetrahydrofuran (THF) (for HPLC, contains stabilizers), manufactured by Wako Pure
Chemical Industries, Ltd.
Flow rate: 1 mL/min
Column temperature: 40° C.
Detection wavelength: 254 nm
Molecular weight standards: PStQuick A/B/C, manufactured by Tosoh Corporation <Synthesis of Hole Transport Polymer 2>

With the exception of replacing the monomers used with a monomer A2 (2.0 mmol), the monomer B1 (5.0 mmol), and the monomer C1 (4.0 mmol), a hole transport polymer 2 was synthesized in the same manner as the synthesis of the hole transport polymer 1. The obtained hole transport polymer 2 had a number average molecular weight of 13,300 and a weight average molecular weight of 78,900.

<Synthesis of Hole Transport Polymer 3>

With the exception of replacing the monomers used with the monomer A1 (2.0 mmol), the monomer B1 (5.0 mmol), and a monomer C2 (4.0 mmol), a hole transport polymer 3 was synthesized in the same manner as the synthesis of the hole transport polymer 1. The obtained hole transport polymer 3 had a number average molecular weight of 12,500 and a weight average molecular weight of 47,100.

<Synthesis of Hole Transport Polymer 4>

With the exception of replacing the monomers used with the monomer A1 (2.0 mmol), the monomer B1 (5.0 mmol), and a monomer C3 (4.0 mmol), a hole transport polymer 4 was synthesized in the same manner as the synthesis of the hole transport polymer 1. The obtained hole transport polymer 4 had a number average molecular weight of 11,800 and a weight average molecular weight of 63,100.

<Synthesis of Hole Transport Polymer 5>

With the exception of replacing the monomers used with the monomer A1 (2.0 mmol), the monomer B1 (5.0 mmol), and a monomer C4 (4.0 mmol), a hole transport polymer 5 was synthesized in the same manner as the synthesis of the hole transport polymer 1. The obtained hole transport polymer 5 had a number average molecular weight of 9,800 and a weight average molecular weight of 52,100.

<Synthesis of Hole Transport Polymer 6>

With the exception of replacing the monomers used with the monomer A2 (2.0 mmol), the monomer B1 (5.0 mmol), and the monomer C3 (4.0 mmol), a hole transport polymer 6 was synthesized in the same manner as the synthesis of the hole transport polymer 1. The obtained hole transport polymer 6 had a number average molecular weight of 10,000 and a weight average molecular weight of 56,000.

<Synthesis of Hole Transport Polymer 7>

With the exception of replacing the monomers used with the monomer A1 (2.0 mmol), a monomer B2 (5.0 mmol), and the monomer C3 (4.0 mmol), a hole transport polymer 7 was synthesized in the same manner as the synthesis of the hole transport polymer 1. The obtained hole transport polymer 7 had a number average molecular weight of 11,100 and a weight average molecular weight of 68,000.

<Synthesis of Hole Transport Polymer 8>

With the exception of replacing the monomers used with the monomer A1 (2.0 mmol), the monomer B1 (5.0 mmol), the monomer C3 (1.0 mmol), and a monomer T1 (3.0 mmol), a hole transport polymer 8 was synthesized in the same manner as the synthesis of the hole transport polymer 1. The obtained hole transport polymer 8 had a number average molecular weight of 10,900 and a weight average molecular weight of 73,500.

<Synthesis of Hole Transport Polymer 9>

With the exception of replacing the monomers used with the monomer A1 (2.0 mmol), the monomer B1 (5.0 mmol), and a monomer T2 (4.0 mmol), a hole transport polymer 9 was synthesized in the same manner as the synthesis of the hole transport polymer 1. The obtained hole transport polymer 9 had a number average molecular weight of 15,900 and a weight average molecular weight of 67,500.

The monomers used in the hole transport polymers 1 to 9 are summarized below in Table 1.

TABLE 1

| Polymer | Monomers |
| --- | --- |
| Hole transport polymer 1 | Monomer A1, monomer B1, monomer C1 |
| Hole transport polymer 2 | Monomer A2, monomer B1, monomer C1 |
| Hole transport polymer 3 | Monomer A1, monomer B1, monomer C2 |
| Hole transport polymer 4 | Monomer A1, monomer B1, monomer C3 |
| Hole transport polymer 5 | Monomer A1, monomer B1, monomer C4 |
| Hole transport polymer 6 | Monomer A2, monomer B1, monomer C3 |
| Hole transport polymer 7 | Monomer A1, monomer B2, monomer C3 |
| Hole transport polymer 8 | Monomer A1, monomer B1, monomer C3, monomer T1 |
| Hole transport polymer 9 | Monomer A1, monomer B1, monomer T2 |

The structural formulas of the monomers are shown below.

[Chemical formula 21]

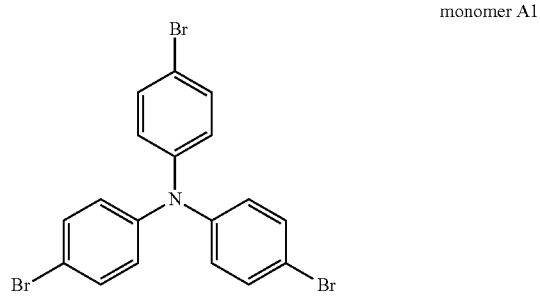

monomer A1

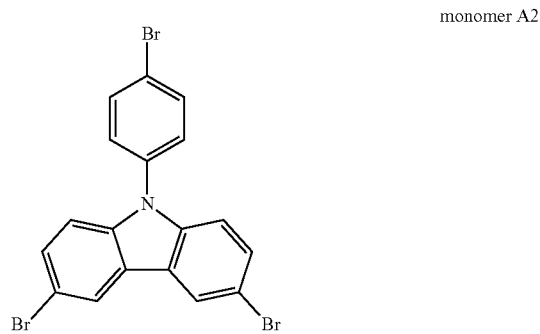

monomer A2

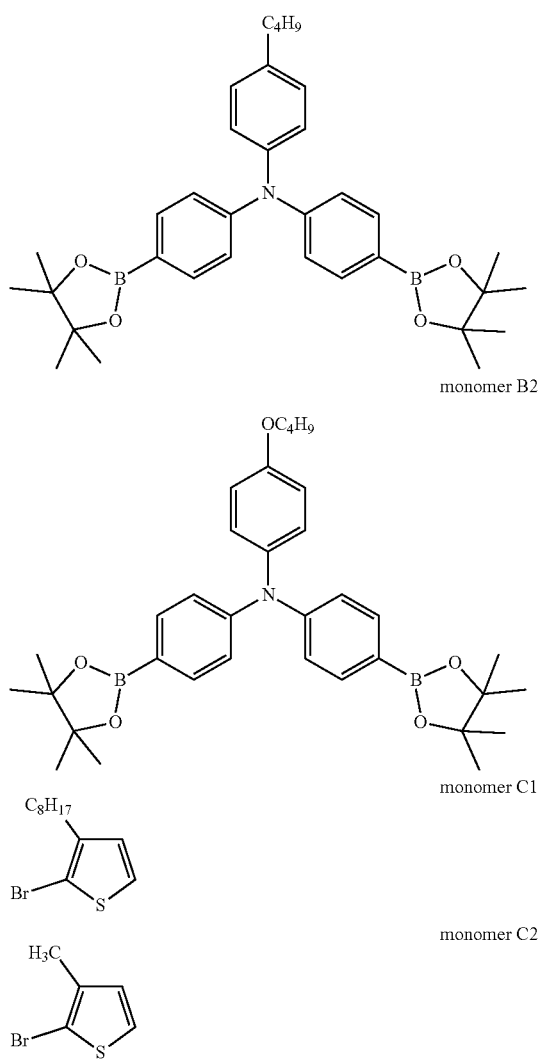

monomer B1 monomer B2 monomer C1 monomer C2 monomer C3 monomer C4 monomer T1 monomer T2

Examples 1 to 6 and Comparative Examples 1 and 2

<Production and Evaluation of Thin Films (Organic Layers) Having Solvent Resistance>

Each of the hole transport polymers 1 to 8 was dissolved in toluene (4.5 mg of the polymer in 465 μL of toluene), and a toluene solution of an initiator 1 or 2 shown below (50 μL initiator concentration: 10 μg/1 μL) was added to produce an ink composition. Further, an ink composition not containing an initiator was also produced. All of the ink compositions were obtained as homogenous solutions.

[Chemical formula 22]

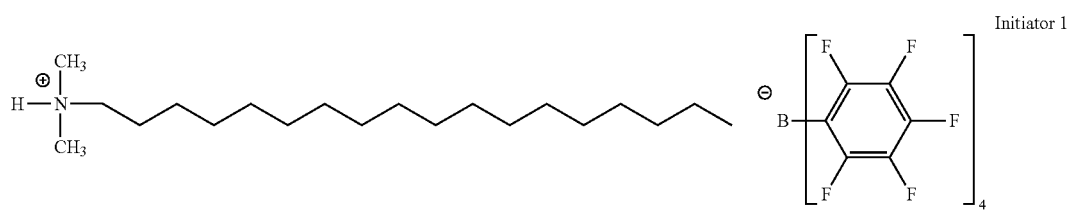

Initiator 1

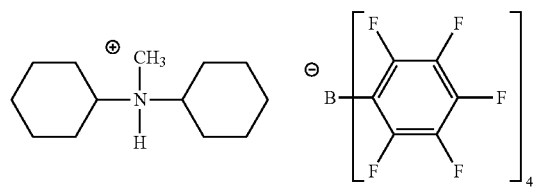

Initiator 2

Each of the produced ink compositions was spin-coated at room temperature (25° C.) at a rotational rate of 3,000 min$^{-1}$ onto a quartz glass plate of 22 mm×29 mm×thickness: 1 mm, thus forming a thin film (1). Subsequently, the thin film (1) was cured by heating on a hot plate at 210° C. for 10 minutes, thus forming a thin film (2) (50 nm). The thin film (2) was grasped together with the quartz glass plate using a pair of tweezers, and was dipped in a 200 mL beaker filled with toluene (25° C.), and the thin film was rinsed by agitating the quartz glass plate 10 times back and forth in the thickness direction of the quartz glass plate over a period of 10 seconds, thus obtaining a thin film (3). The ratio between the absorbance values of the thin film before and after the rinsing process was used to determine the residual ratio (residual film ratio) for the thin film (3). The results are summarized in Table 2.

The absorbance measurement conditions were as follows.

Measurement of the absorbance was performed using a spectrophotometer (U-3310, manufactured by Hitachi, Ltd.). The absorbance of the thin film at the maximum absorption within a wavelength range from 300 to 420 nm was determined.

TABLE 2

| | Polymer | Initiator 1 Residual film ratio (%) | Initiator 2 Residual film ratio (%) | No initiator Residual film ratio (%) |
|---|---|---|---|---|
| Example 1 | Hole transport polymer 3 | 97 | 95 | 5 |
| Example 2 | Hole transport polymer 4 | 98 | 96 | 6 |
| Example 3 | Hole transport polymer 5 | 95 | 96 | 9 |
| Example 4 | Hole transport polymer 6 | 94 | 97 | 11 |
| Example 5 | Hole transport polymer 7 | 98 | 99 | 12 |
| Example 6 | Hole transport polymer 8 | 94 | 92 | 10 |
| Comparative Example 1 | Hole transport polymer 1 | 99 | 97 | 10 |
| Comparative Example 2 | Hole transport polymer 2 | 99 | 97 | 20 |

As is evident from Table 2, the thin films (organic layers) obtained using the ink compositions according to an embodiment of the present invention exhibited excellent results, with residual ratios of at least 90% in all cases. The thin films (organic layers) obtained from compositions which underwent a change in the degree of solubility had favorable solvent resistance even when the polymer contained within the composition did not contain typical polymerizable substituents such as styryl groups or oxetanyl groups. These examples were able to confirm the effect of the thienyl group. By using a composition that undergoes a change in the degree of solubility, multilayering by coating methods can be achieved in organic electronic elements.

Examples 7 to 12 and Comparative Examples 3 and 4

<Evaluation of Surface Free Energy>

Using the hole transport polymers 1 to 8, the surface free energy was evaluated.

A toluene solution prepared by dissolving 10 mg of the polymer in 2 g of toluene was dripped onto a quartz glass substrate, and spin-coating was performed under conditions including a rotational rate of 3,000 min$^{-1}$ for 60 seconds. Subsequently, a baking treatment was performed at 210° C. for 10 minutes, thus producing a polymer film.

Pure water and diiodomethane were dripped onto the polymer film, and the respective contact angles were measured using the method described below. Measurements were performed using a contact angle meter (DropMaster 500, manufactured by Kyowa Interface Science Co., Ltd.).

In an open atmosphere at room temperature (25° C.), 1 µL of pure water (25° C.) or diiodomethane (25° C.) was discharged from the needle tip of a syringe (provided as a standard accessory for the DropMaster 500), thus forming a liquid droplet at the needle tip. The needle tip was then moved closer to the polymer film until the liquid droplet touched the polymer film. When the liquid droplet touched the polymer film, the syringe was withdrawn away from the polymer film. Ten seconds after liquid contact (after the liquid droplet had contacted the polymer film), an image analysis of the liquid droplet was performed, the contact angle was determined by the θ/2 method, and the average of four measurements was calculated.

The contact angles (average values) were inserted into formulas (5) and (6) shown above, and the polar component (mJ/m$^2$) and the non-polar component (mJ/m$^2$) of the surface free energy of the polymer film were calculated. The results are shown in Table 3.

TABLE 3

| | Surface free energy (mJ/m$^2$) | | |
|---|---|---|---|
| Polymer | Polar component | Non-polar component | Sum |
| Hole transport polymer 3 | 3.90 | 38.71 | 42.61 |
| Hole transport polymer 4 | 5.32 | 38.05 | 43.37 |
| Hole transport polymer 5 | 4.22 | 38.58 | 42.80 |
| Hole transport polymer 6 | 4.10 | 38.51 | 42.61 |
| Hole transport polymer 7 | 6.55 | 36.42 | 42.97 |
| Hole transport polymer 8 | 3.90 | 38.71 | 42.61 |
| Hole transport polymer 1 | 3.40 | 36.23 | 39.63 |
| Hole transport polymer 2 | 3.78 | 36.19 | 39.97 |

As shown in Table 3, the surface free energy results differed depending on the alkyl groups within the polymer (A). The polymers of Comparative Examples 1 and 2 which had alkyl groups of 5 or more carbon atoms had lower surface free energy values, whereas the polymers of Examples 1 to 6 which had no alkyl groups of 5 or more carbon atoms each exhibited a high surface free energy of 41 mJ/m$^2$ or greater. In order to ensure more favorable wetting properties for the ink composition used in forming an upper layer such as a hole transport layer or a light-emitting layer or the like, the surface free energy of the polymer (A) is preferably high. By ensuring that the polymer (A) has no alkyl groups of 5 or more carbon atoms, the film formability of the upper layer is improved.

<Production of Organic EL Elements>

Organic EL elements were produced containing one of the hole transport polymers 1 to 8 as a hole injection layer, and the characteristics of the elements were evaluated.

Example 7

(Formation of Hole Injection Layer)

The hole transport polymer 3 (10.0 mg), the above initiator 1 (0.5 mg) and toluene (2.3 mL) were mixed together in the open atmosphere to prepare an ink composition. This ink composition was spin-coated at a rotational rate of 3,000 min$^{-1}$ onto a glass substrate on which ITO had been patterned with a width of 1.6 mm, and was then cured by heating on a hot plate at 200° C. for 30 minutes, thus forming a hole injection layer (30 nm).

(Formation of Hole Transport Layer)

The hole transport polymer 9 (10.0 mg), an onium salt (the above initiator 1) (0.5 mg) and toluene (2.3 mL) were mixed together in the open atmosphere to prepare an ink composition. This ink composition was spin-coated at a rotational rate of 3,000 $min^{-1}$ onto the above hole injection layer, and was then heated on a hot plate at 230° C. for 30 minutes in a nitrogen atmosphere, thus forming a hole transport layer (30 nm).

Subsequently, the glass substrate was transferred into a vacuum deposition apparatus, layers of CBP:Ir(ppy)$_3$ (94:6, 30 nm), BAlq (10 nm), TPBi (30 nm), LiF (0.8 nm) and Al (100 nm) were deposited in that order using deposition methods on top of the hole transport layer, and an encapsulation treatment was then performed to complete production of an organic EL element.

Example 8

With the exception of replacing the hole transport polymer 3 with the hole transport polymer 4 in the step for forming the hole injection layer in the organic EL element of Example 7, an organic EL element was produced in the same manner as Example 7.

Example 9

With the exception of replacing the hole transport polymer 3 with the hole transport polymer 5 in the step for forming the hole injection layer in the organic EL element of Example 7, an organic EL element was produced in the same manner as Example 7.

Example 10

With the exception of replacing the hole transport polymer 3 with the hole transport polymer 6 in the step for forming the hole injection layer in the organic EL element of Example 7, an organic EL element was produced in the same manner as Example 7.

Example 11

With the exception of replacing the hole transport polymer 3 with the hole transport polymer 7 in the step for forming the hole injection layer in the organic EL element of Example 7, an organic EL element was produced in the same manner as Example 7.

Example 12

With the exception of replacing the hole transport polymer 3 with the hole transport polymer 8 in the step for forming the hole injection layer in the organic EL element of Example 7, an organic EL element was produced in the same manner as Example 7.

Comparative Example 3

With the exception of replacing the hole transport polymer 3 with the hole transport polymer 1 in the step for forming the hole injection layer in the organic EL element of Example 7, an organic EL element was produced in the same manner as Example 7.

Comparative Example 4

With the exception of replacing the hole transport polymer 3 with the hole transport polymer 2 in the step for forming the hole injection layer in the organic EL element of Example 7, an organic EL element was produced in the same manner as Example 7.

<Evaluation of Organic EL Elements>

When a voltage was applied to the organic EL elements obtained in Examples 7 to 12, and Comparative Examples 3 and 4, green light emission was confirmed in each case. For each element, the drive voltage and emission efficiency at an emission luminance of 5,000 cd/m$^2$ and the emission lifespan (luminance half-life) when the initial luminance was 5,000 cd/m$^2$ were measured. The measurement results are shown in Table 4.

[Table 4]

TABLE 4

| | Drive voltage (V) | Emission efficiency (cd/A) | Emission lifespan (h) |
|---|---|---|---|
| Example 7 | 7.9 | 33.9 | 250 |
| Example 8 | 7.9 | 33.0 | 267 |
| Example 9 | 7.6 | 32.1 | 300 |
| Example 10 | 7.6 | 33.8 | 287 |
| Example 11 | 7.8 | 33.1 | 266 |
| Example 12 | 7.6 | 32.9 | 210 |
| Comparative Example 3 | 8.2 | 33.6 | 170 |
| Comparative Example 4 | 8.1 | 33.9 | 184 |

As shown in Table 4, the organic EL elements of Examples 7 to 12 exhibited a longer emission lifespan than the organic EL elements of Comparative Examples 3 and 4. In other words, from the viewpoint of the component materials of the organic layer (the lower layer), it was evident that by using a polymer (A) that had no alkyl groups of 5 or more carbon atoms, and had a terminal thienyl group that was either unsubstituted or had an alkyl group of 1 to 4 carbon atoms, an improvement could be achieved in the emission lifespan of the organic EL element.

Effects of the embodiments of the present invention have been illustrated above using specific examples. However, the present invention is not limited to the polymers (A) used in the examples, and organic electronic elements can be obtained in a similar manner using other polymers (A) and initiators (B), provided they remain within the scope of the present invention. The resulting organic electronic elements exhibit superior characteristics similar to those obtained in each of the above examples.

REFERENCE SIGNS LIST

1: Light-emitting layer
2: Anode
3: Hole injection layer
4: Cathode
5: Electron injection layer
6: Hole transport layer
7: Electron transport layer
8: Substrate

The invention claimed is:

1. A composition comprising a polymer or oligomer (A) and an initiator (B), wherein
   the polymer or oligomer (A) comprises no alkyl groups of 5 or more carbon atoms, comprises at least an aromatic amine structure, wherein the aromatic amine structure has no alkyl groups of 5 or more carbon atoms and the aromatic amine structure includes an aromatic amine structure that has an alkoxy group of 1 to 4 carbon atoms, and the polymer or oligomer (A) also comprises, at one or more terminals, a structural unit containing a thienyl group which may have a substituent, wherein the thienyl group includes at least one type of structure selected from the group consisting of a structure represented by formula (Ia) shown below and a structure represented by formula (Ib) shown below:

[Chemical formula 1]

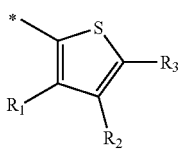

Formula (Ia)

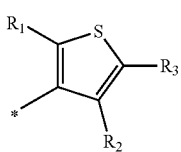

Formula (Ib)

wherein each of $R^1$ to $R^3$ in formula (Ia) and formula (Ib) independently represents a hydrogen atom, and a degree of solubility of the composition is capable of being changed by applying heat, light, or both heat and light.

2. The composition according to claim 1, wherein the polymer or oligomer (A) has a branched structure with three or more terminals, and has the thienyl group at each of three or more of all of the terminals.

3. The composition according to claim 1, wherein the initiator (B) comprises an oxidizing agent.

4. The composition according to claim 1, wherein the initiator (B) comprises an onium salt.

5. The composition according to claim 1, wherein a weight average molecular weight of the polymer or oligomer (A) is from 1,000 to 1,000,000.

6. The composition according to claim 1, further comprising a solvent (C).

7. The composition according to claim 1, wherein a surface free energy of the polymer or oligomer (A), represented by a sum of a polar component and a non-polar component determined by the Owens-Wendt method, is at least 41 $mJ/m^2$.

8. A hole transport material composition comprising the composition according to claim 1.

9. An ink composition comprising the composition according to claim 1.

10. An organic layer that is formed by applying the composition according to claim 1, and then applying heat, light, or both heat and light.

11. A method for producing an organic layer that comprises:
a step of forming a coating layer by applying the composition according to claim 1, and
a step of applying heat, light, or both heat and light to the coating layer.

12. An organic layer that is formed by applying the hole transport material composition according to claim 8, and then applying heat, light, or both heat and light.

13. A method for producing an organic layer that comprises:
a step of forming a coating layer by applying the hole transport material composition according to claim 8, and
a step of applying heat, light, or both heat and light to the coating layer.

14. An organic layer that is formed by applying the ink composition according to claim 9, and then applying heat, light, or both heat and light.

15. A method for producing an organic layer that comprises:
a step of forming a coating layer by applying the ink composition according to claim 9, and
a step of applying heat, light, or both heat and light to the coating layer.

* * * * *